United States Patent
Rand et al.

(10) Patent No.: US 12,301,769 B2
(45) Date of Patent: May 13, 2025

(54) ECHO CANCELLATION

(71) Applicant: Cirrus Logic International Semiconductor Ltd., Edinburgh (GB)

(72) Inventors: Robert D. Rand, Peebles (GB); Jon E. Eklund, Austin, TX (US); Pradeep Saminathan, Edinburgh (GB); Peter Horsfall, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 179 days.

(21) Appl. No.: 18/073,062

(22) Filed: Dec. 1, 2022

(65) Prior Publication Data

US 2023/0199122 A1 Jun. 22, 2023

Related U.S. Application Data

(60) Provisional application No. 63/292,181, filed on Dec. 21, 2021.

(30) Foreign Application Priority Data

Feb. 2, 2022 (GB) .................................. 2201333

(51) Int. Cl.
*H04M 9/08* (2006.01)
*H04R 3/12* (2006.01)

(52) U.S. Cl.
CPC .............. *H04M 9/082* (2013.01); *H04R 3/12* (2013.01)

(58) Field of Classification Search
CPC ................................. H04M 9/082; H04R 3/12
See application file for complete search history.

(56) References Cited

U.S. PATENT DOCUMENTS

| | | | |
|---|---|---|---|
| 4,609,787 A | 9/1986 | Horna | |
| 8,184,801 B1 | 5/2012 | Hamalainen | |
| 8,965,014 B2 | 2/2015 | Castor-Perry | |
| 9,949,057 B2 | 4/2018 | Mihelich et al. | |
| 10,622,004 B1* | 4/2020 | Zhang | G10L 25/78 |
| 2006/0239443 A1 | 10/2006 | Oxford et al. | |
| 2019/0379959 A1* | 12/2019 | Kim | H04R 3/005 |
| 2021/0382672 A1* | 12/2021 | Back | H04R 5/02 |
| 2021/0382678 A1* | 12/2021 | Back | H04M 3/568 |
| 2021/0383786 A1* | 12/2021 | Back | G10K 11/17854 |
| 2022/0360896 A1* | 11/2022 | Jeapes | H04R 5/04 |

OTHER PUBLICATIONS

International Search Report and Written Opinion, Application No. PCT/GB2022/053031, mailed Feb. 16, 2023.
Examination Report under Section 17, UKIPO, Application No. GB2201333.8, dated Aug. 1, 2022.

* cited by examiner

*Primary Examiner* — Simon King
(74) *Attorney, Agent, or Firm* — Jackson Walker L.L.P.

(57) ABSTRACT

In an example, an audio system, which may comprise an integrated circuit, comprises an amplifier and a combiner. The amplifier is configured to output a first amplified audio signal to a speaker. The combiner is configured to: receive the first amplified audio signal from the amplifier, receive a second audio signal, combine the first amplified audio signal and second audio signal into a combined signal, and output the combined signal.

18 Claims, 19 Drawing Sheets

ECHO CANCELLATION

TECHNICAL FIELD

Examples described herein relate to audio systems that can control multiple speakers. Particularly, the examples described herein relate to audio systems that are configured to generate one or more echo cancellation signals for one or more audio outputs. The system may comprise one or more integrated circuits.

BACKGROUND

It may be desirable for certain devices to have multiple speakers, for example to enhance a user's experience. To facilitate the amplified output of an audio signal, a processor may transmit an audio signal to an amplifier which generates an amplified audio signal to be output to a speaker. To reduce or avoid audio feedback, an echo cancellation signal may be generated and transmitted to the processor.

STATEMENTS OF INVENTION

According to some examples there is provided an audio system comprising an amplifier configured to output a first amplified audio signal to a speaker, wherein the audio system is configured to transmit a signal for echo cancellation, and wherein the signal for echo cancellation is based on the orientation of the speaker.

The amplifier may have a transfer function and the transfer function may depend on the orientation of the speaker. The signal for echo cancellation may depend on the transfer function of the amplifier. The amplifier settings may depend on the orientation of the speaker. The amplifier may be configurable as a woofer or as a tweeter. The function of the speaker may depend on the position and/or orientation of the speaker.

According to some examples there is provided an amplifier that is configured to output an amplified audio signal to a speaker, and a combiner that is configured to receive the amplified signal, combine it with another audio signal to generate a combined signal, and output the combined signal. The amplifier and combiner may be provided as components on an integrated circuit or the combiner may be provided as part of a separate component (such as an external processor such as a host processor or digital signal processor, or a codec etc.) coupled to the amplifier. The second audio signal received by the combiner may be received from another amplifier or from another combiner (in which case the second audio signal is itself a combined signal output from the other combiner).

According to some examples there is provided an audio system comprising: an amplifier configured to output a first amplified audio signal to a speaker; and a combiner, wherein the combiner is configured to: receive the first amplified audio signal from the amplifier; receive a second audio signal; combine the first amplified audio signal and second audio signal into a combined signal; and output the combined signal.

The system may further comprise a delay line configured to delay the first amplified audio signal, wherein the combiner is configured to: receive the delayed first amplified audio signal; and combine the first delayed amplified audio signal and the second audio signal into the combined signal; and output the combined signal.

The system may be further configured to receive an audio signal, and wherein the system further comprises: a first filter configured to produce a filtered audio signal from the received audio signal, and wherein the first amplified audio signal is the amplified filtered audio signal.

The system may further comprise a second filter configured to: separate the combined signal into first and second sub-signals, and wherein the system is configured to: output the first and second sub-signals.

The system may further comprise a delay line configured to delay the first and/or second sub-signal, and wherein the system is configured to: output the first and/or second delayed sub-signal.

The combiner may be configured to: receive m signals, including the first amplified audio signal and the second audio signal; combine the m received signals into n signals including the combined signal, with n<m; and output the n signals.

In some examples, the amplifier is a first amplifier and wherein the system comprises a plurality of amplifiers including the first amplifier, and wherein the combiner is configured to receive the second audio signal from at least one other amplifier in the plurality.

In some examples, the plurality of amplifiers comprises a second amplifier, wherein the second amplifier is configured to output a second amplified audio signal to a speaker, and wherein the second audio signal comprises the second amplified audio signal such that the combiner is configured to: receive the first amplified audio signal from the first amplifier; receive the second amplified audio signal from the second amplifier; combine the first amplified audio signal and the second amplified audio signal into the combined signal; and output the combined signal.

In some examples, the combiner is a first combiner, and the system comprises a second combiner, wherein the second audio signal is a second combined signal output from the second combiner.

In some examples, the amplifier is a first amplifier and the speaker is a first speaker, wherein the system comprises a plurality of amplifiers including the first amplifier, a second amplifier, and a third amplifier, wherein the second amplifier is configured to output a second amplified audio signal to a second speaker, wherein the third amplifier is configured to output a third amplified audio signal to a third speaker, and wherein the second combiner is configured to: receive the second amplified audio signal from the second amplifier; receive the third amplified audio signal from the third amplifier; combine the second amplified audio signal and the third amplified audio signal into the second combined signal; and output the second combined signal, and wherein the first combiner is configured to receive the first amplified audio signal from the first amplifier; receive the second combined signal from the second combiner; combine the first amplified audio signal and the second combined signal into the first combined signal; and output the first combined signal.

In some examples, the amplifier is a first amplifier and the combiner is a first combiner, and wherein the system comprises a plurality of amplifiers including the first amplifier and a plurality of combiners including the first combiner, and wherein each amplifier in the plurality is associated with a respective combiner, the respective combiner of each amplifier in the plurality being configured to: receive an amplified signal output from its respective amplifier in the plurality; receive another signal received from another amplifier or another combiner; combine the received signals into a combined signal; and output the combined signal.

The audio system may be an integrated circuit comprising the amplifier and the combiner; or a plurality of integrated circuits, one comprising the amplifier and another comprising the combiner.

The audio system may further comprise a codec, external processor, or DSP, and wherein the codec, external processor, or DSP comprises the combiner.

The audio system may be part of a device, such as a mobile phone, tablet, or computer.

According to an example there is provided an audio system (which may comprise one or more integrated circuits) comprising: an amplifier configured to output a first amplified audio signal to a speaker; and a combiner, wherein the combiner is configured to: receive a first number of audio signals including the first amplified audio signal from the amplifier; receive a second number of audio signals; combine the first and second number of signals into a third number of audio signals, the third number being less than the sum of the first and second numbers; and output the third number of signals.

According to an example there is provided a printed circuit board (PCB) assembly comprising the audio system as above, wherein the audio system is an IC mounted, attached, or otherwise secured to the PCT assembly; optionally wherein the PCB further comprises one or more speakers.

According to an example there is provided an audio system (which may comprise one or more integrated circuits) comprising a first module and an other module joined in series; wherein the first module comprises a first amplifier and a second amplifier, and a first combiner configured to receive amplified audio outputs from the first and second amplifiers, combine them into a first combined audio signal; and output the first combined audio signal to the other module; wherein the other module comprises a third amplifier and a second combiner; wherein the second combiner is configured to receive the amplified audio output from the third amplifier and the first combined signal from the first module, combine them into a second combined audio signal, and output the second combined audio signal to another module or to a host processor.

According to an example there is provided an audio system (which may comprise one or more integrated circuits) comprising a plurality of amplifiers and a combiner, wherein the combiner is configured to receive a first number of amplified audio signals from two or more of the amplifiers, and combine one or more of the first number of audio signals into a second number of audio signals, the second number being less than the first, and output the second number of audio signals.

According to an example there is provided an audio system (which may comprise one or more integrated circuits) comprising one or signal chains, each signal chain being configured to reduce a plurality of amplified audio signals into a lesser number of amplified audio signals; each signal chain comprising at least two amplifiers and at least one combiner, the combiner in each chain being configured to receive a first number of audio signals and output a second, lesser, number of audio signals.

The audio system may comprise a microphone. The microphone may be configured to receive audio from the speaker (e.g. as a feedback signal) and output the received audio to a processor (such as a host processor), optionally to an audio processor first to generate and output (to the processor) a processed signal. The signal from the microphone be the subject of an echo-cancellation algorithm performed by the processor (e.g. based on the combined signal(s) received from a combiner). In examples, the audio system comprises a processor configured to receive a signal (e.g. from a combiner) and perform echo-cancellation (e.g. execute instructions which cause the processor to cause an echo cancellation on) the received signal.

The combiner may also be referred to as an aggregator or a summer or a reducer, configured to aggregate, combine or sum two signals or otherwise reduce a number of signals into a lesser number of signals etc. Accordingly, the combined signal may also be referred to as an aggregated, combined, summed signal and/or reduced signal etc.

Therefore, the examples herein enable any number of amplifiers, each outputting an amplified signal to a respective speaker to be used in conjunction with a host processor accepting any number of inputs (e.g. for echo cancellation). For instance, a host processor may only be configured to receive two inputs, such as two channels, each channel configured to receive an echo cancellation signal. In this example, any number of speakers may be used since the amplified signals from the associated amplifiers may be combined, by a combiner, to reduce the number of signals and therefore to reduce the number of inputs to the host processor. To achieve this, in one example, a single combiner may be configured to receive any number of inputs (e.g. one for each amplifier/speaker pair) and generate a combined signal comprising any number of outputs (e.g. one for a mono signal, two for a stereo signal, or more for multichannel surround sound systems such as 5.1 or 7.1 for example). In another example, multiple combiners may be part of a signal chain to reduce the number of audio signals in stages. For example, the first combiner in such a series may receive two amplified signals each from respective amplifiers and output the combined signal to another subsequent combiner (next in the chain), which also receives the input from another amplifier. In this way a series of amplified signals may be "chained" and sent back to the host processor as a reduced number of signals, for example the final combiner in the chain may output a single chain combined audio signal to the host processor. In yet another example, for a host processor receiving two inputs, two series of amplified signal mays be "chained" and the host processor may receive two chain combined signals from two respective combiners, each being last in their respective signal chain.

The examples described herein therefore support devices with multiple speakers and do so independently of other factors such as the frequency output of those speakers and/or the position and/or orientation of the speakers and/or the device of which the speakers form a part.

INTRODUCTION OF THE FIGURES

The present disclosure may be understood with reference to the accompanying drawings in which.

Figure 12:
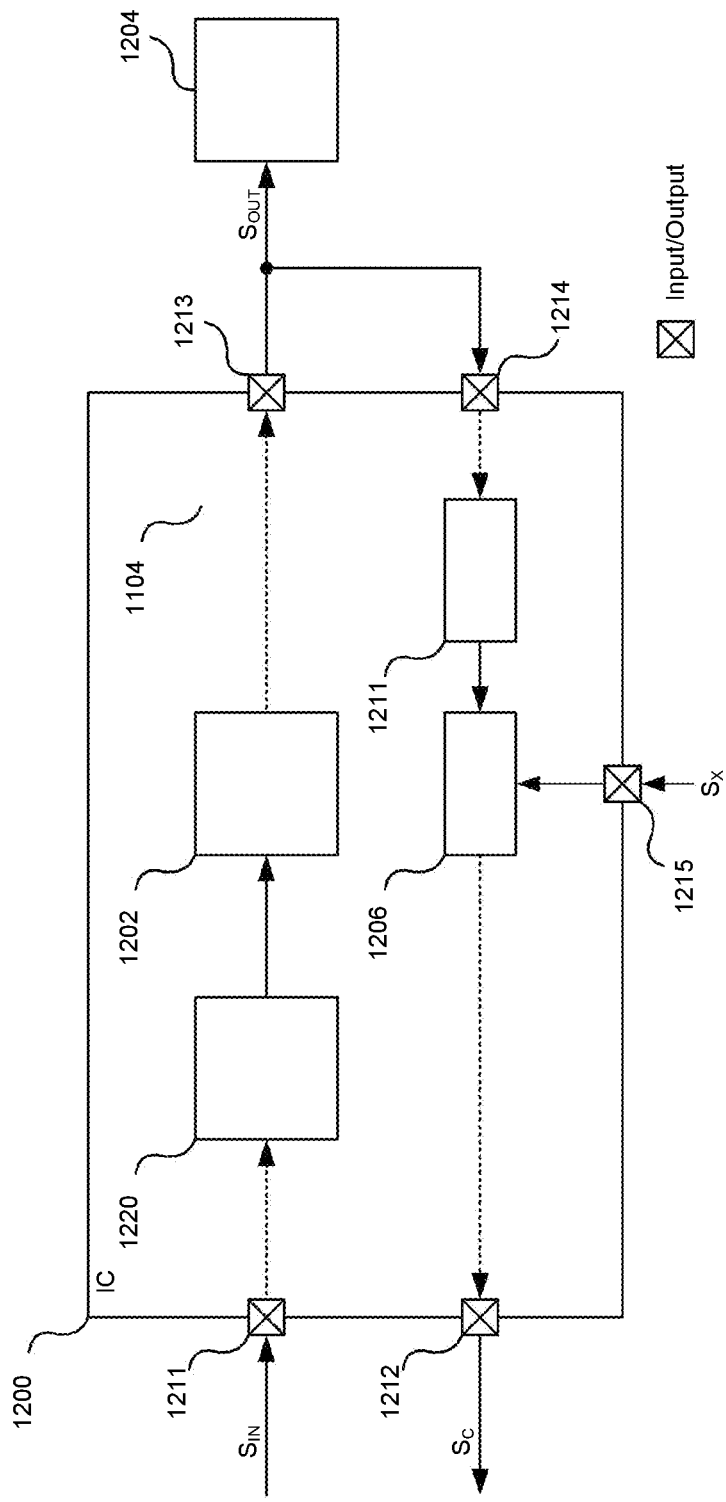
Figure 13:
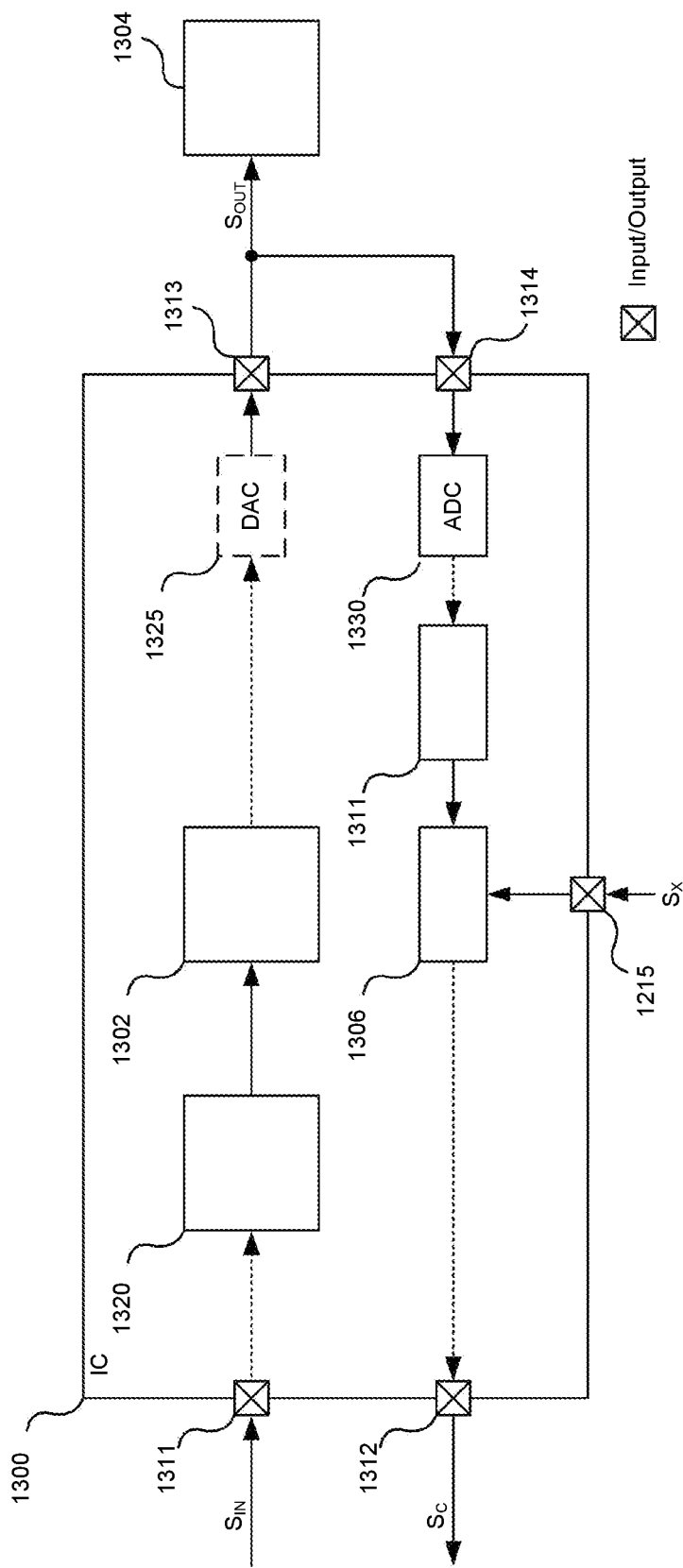
Figure 14:
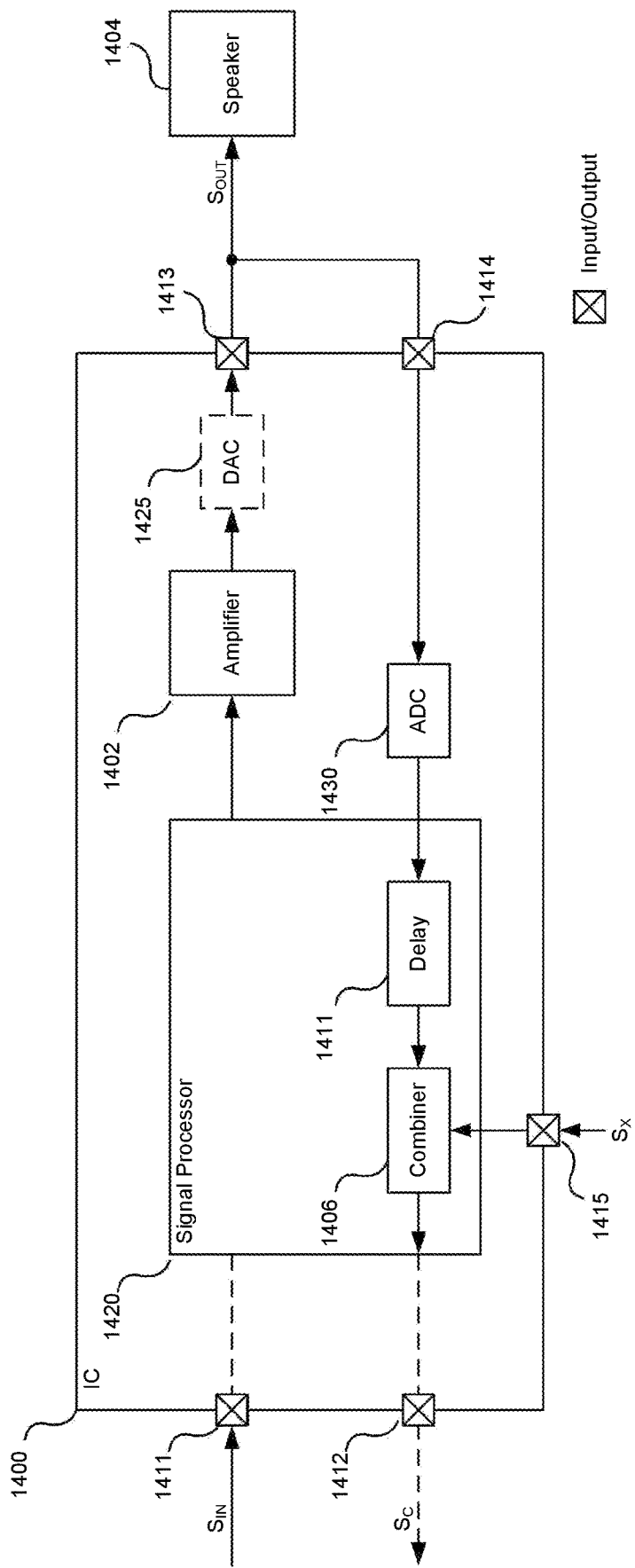
Figure 16C:
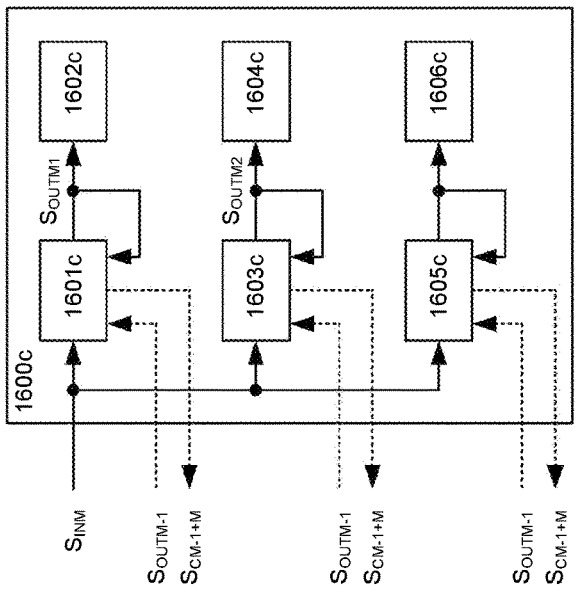
Figure 16B:
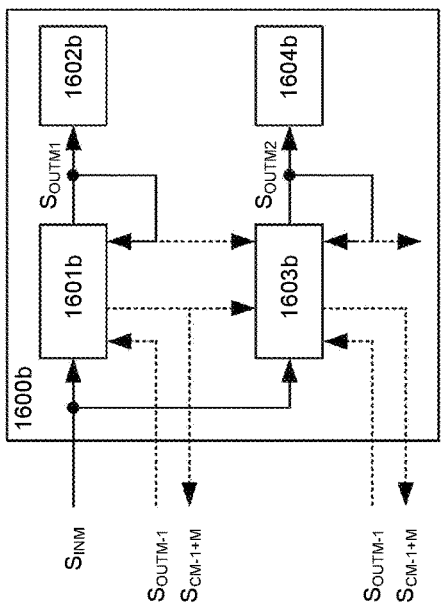
Figure 16A:
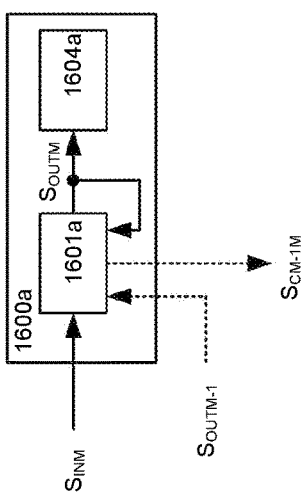
Figure 16D:
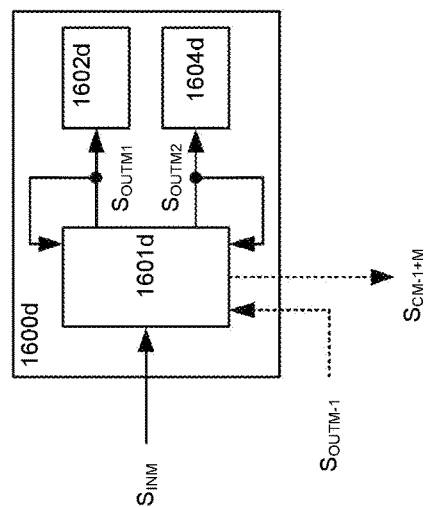
Figure 17:
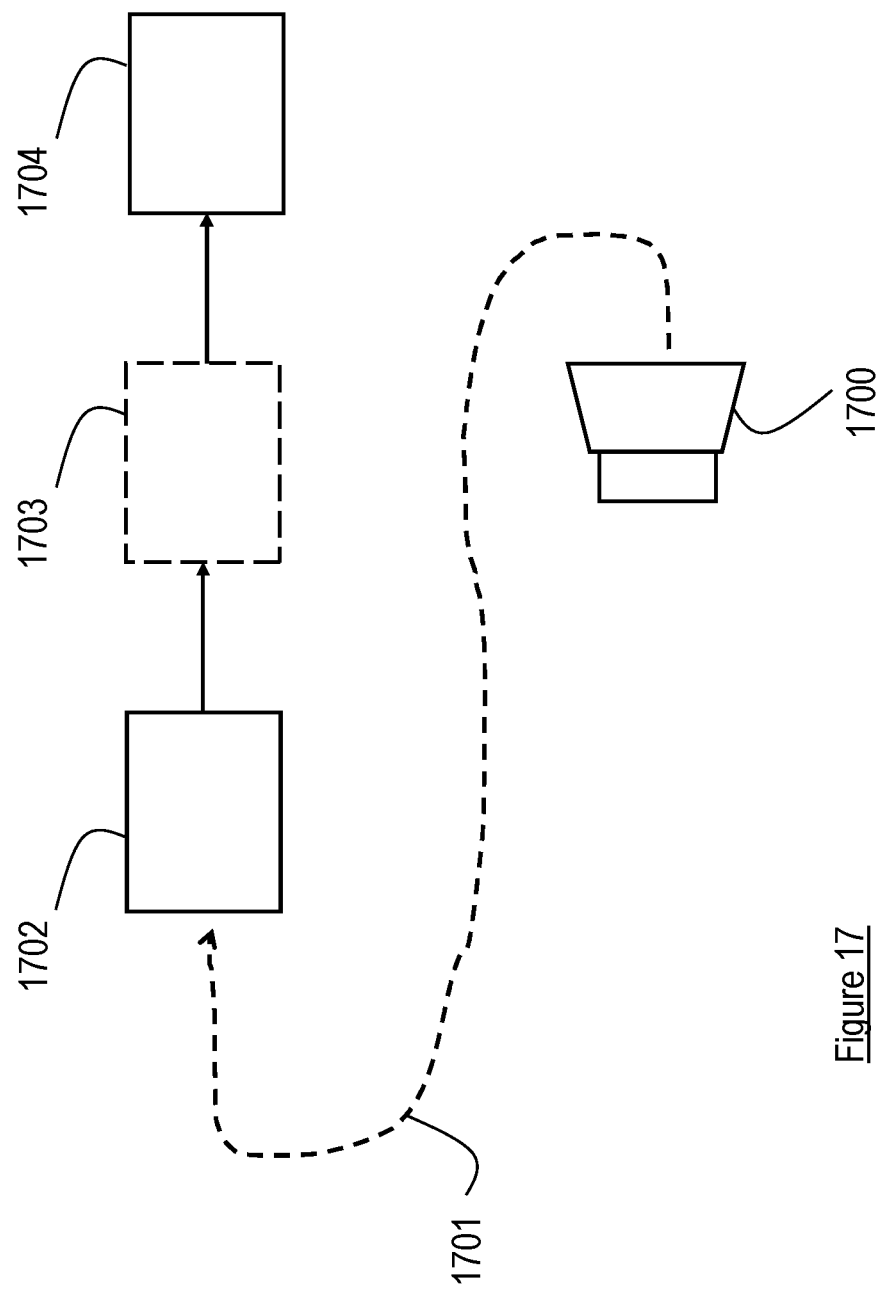

FIGS. 11a-e are simplified schematic block diagrams of example integrated circuits;

FIG. 12 is a simplified schematic block diagram of an example integrated circuit;

FIG. 13 is a simplified schematic block diagram of an example integrated circuit;

FIG. 14 is a simplified schematic block diagram of an example integrated circuit FIGS. 15a-e are simplified schematic block diagrams of an example device;

FIGS. 16a-d are simplified schematic block diagrams of an example printed circuit board assembly; and FIG. 17 is a simplified schematic block diagram of a microphone in association with a speaker and in association with a host processor.

DETAILED DESCRIPTION

With the advent of smart digital audio technologies, modern audio and communication systems, and their associated apparatus, have dramatically changed the ways in which people communicate, interact, and engage with each other. Devices, such as laptops, tablets and mobile phones for example, are increasingly in demand as a result of their smart and intelligent features and their abilities to connect to the internet and/or cellular communications networks. Technologies such as HiFi surround sound and speaker protection for example are at the vanguard of audio signal processing. Immersive audio has made communicating with one another a more natural process for both speaker and listener. There are many tools and techniques that enable these high-quality audio experiences.

Digital audio signal processing, also referred to as audio signal processing or signal processing, by a signal processor comprises circuitry and/or methods wherein an array of different algorithms and/or techniques may be applied to digital audio signals to perform a vast array of tasks such as, for example, removing or minimising: noise, distortion, overmodulation, echo, feedback etc. Other tasks that may be performed by digital audio signal processing circuitry and/or methods include signal filtering and the protection of coupled transducers from potentially damaging effects, one example of protecting the speaker from a damaging effect being speaker protection from overvoltage.

Example digital audio signal processing techniques comprise:
  automatic echo cancellation (AEC) which removes or minimises echo, reverberation and/or unwanted noise caused by acoustic coupling between one or more microphones and one or more loudspeakers;
  filtering which removes unwanted noise, echo, distortion, and allows the filtered data to pass through the filter, example filters comprising a low-pass filter, a high-pass filter, a bandpass filter and a band-rejection/stop filter;
  equalisation which alters or adjusts the frequency so that the sound spectrum frequency at the transmitter should match the sound spectrum's frequency at the receiver;
  automatic gain control (AGC) or loudness control (LC) which ensures a constant output signal level despite having various different input signal levels; and
  beamforming, also known as spatial filtering, which is a signal processing technique used in microphone array processing by exploiting the microphones' spatial diversity in the array to detect and extract desired source signals and suppress unwanted interference so as to direct and steer the composite microphones' directivity beam in a particular direction based on the signal source direction so as to boost the composite range of microphones and increase the signal-to-noise (SNR) ratio.

The audio systems, integrated circuits and/or processors (such as an external processor, host processor, digital signal processor etc.) disclosed herein may be configured to perform any one, or combination of, the above audio signal processing techniques as will now be described.

Figure 1:
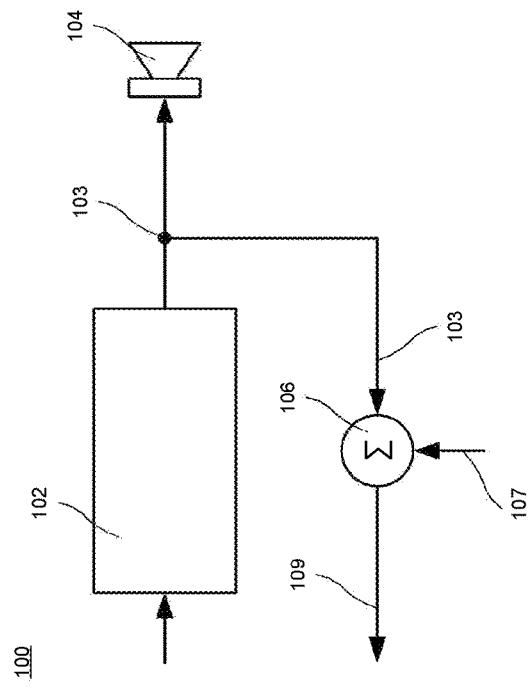
FIG. 1 is a simplified schematic block diagram of an example audio system.

FIG. 1 shows an audio system 100. The audio system 100 comprises an amplifier 102 which is configured to receive an input audio signal and output a first amplified audio signal 103 to a speaker 104. The audio system 100 further comprises a combiner (or aggregator, or adder, or summer) 106 which is configured to receive the first amplified audio signal 103 from the amplifier 102, receive a second audio signal 107, combine the first amplified audio signal 103 and second audio signal 107 into a combined audio signal 109, and output the combined audio signal 109. Amplifying and combining are further examples of audio signal processing and therefore the audio system 100 may be considered an audio signal processing system. It be further configured to perform any of the audio processing techniques as discussed above (which will be discussed further with reference to FIG. 2). The amplifier 102 and combiner 106 functions may be performed by a single element, such as an amplification unit or module, or a combination unit or module, or by any suitable combination of elements (such as combinatorial logic or hardware, or by a processor executing software, firmware and/or an amplification or combination algorithm).

The audio system 100 illustrated in FIG. 1 may comprise an integrated circuit and the amplifier 102 and combiner 106 are components of the integrated circuit in this example. In other examples, the amplifier 102 may be a component of a first integrated circuit and the combiner 106 may be a component of another entity (such as a second integrated circuit, or a processor, such as an application processor or a digital signal processor (DSP), or a codec).

The second audio signal 107 received by the combiner 106 may be received from another amplifier, in which case the combined signal 109 comprises two amplified audio signals. Alternatively, the second audio signal 107 may be received from another combiner, in which case the signal 107 is a combined signal and in which case the combined signal 109 comprises three or more amplified audio signals. Therefore, the system 100 may depict any part of a chain of signal combinations, i.e. signal chain combination. These signal chain combinations will be described in more detail below with reference to other figures but, in one example, the combiner 106 may combine two amplified audio signals received from two respective amplifiers and output the combined signal 109 to another combiner. In this example, the system 100 therefore represents the beginning of a chain of amplified audio signals. In another example, the combiner 106 receives the amplified signal from the amplifier 102 and a combined signal 107 from another combiner, and outputs the combined signal 109 to another combiner. In this example the system 100 therefore represents an intermediate portion of a chain of amplified audio signals, since the combiner 106 receives a signal comprised of multiple amplified audio signals and transmits its own combined signal to another combiner. In yet another example, the combiner receives the amplified signal from the amplifier 102 and a second signal 107 either from another amplifier or from another combiner and outputs the combined signal 109 to a processor (e.g. a host processor of the system). In outputting the combined signal to a processor in this example, the system 100 is at the end of the chain of audio signals and outputs the final chain combination for that chain of amplifiers.

The system 100 may be employed for feedback and/or echo cancellation for example, which may be employed to reduce and/or eliminate instances of feedback and/or echo. Since the combined audio signal 109 contains the amplified audio signal output from the amplifier 102 and at least one other amplified audio signal received from another amplifier, a processor receiving the combined audio signal 109 can use a signal processing algorithm, such as for automatic echo cancellation (AEC) for example on the received audio signal 109 to reduce the instances of echo and/or feedback. This thereby enhances the standard of performance and user experience independently of how many speakers and audio channels a given system requires.

The amplifier 102 may be configured and/or reconfigured on startup and/or during runtime, such as by executing firmware and/or software. The amplifier may be configured by a manufacturer or a user, for example a user may wish to change the "factory settings" and tailor the amplifier settings according to their own desires, such as by calibrating the amplifier (e.g. adjusting its equalisation settings) to tailor the speaker output to their personal preference. The amplifier settings may also be tailored on-the-fly by a user according to the type of audio they are listening to and/or in response to a particular microphone input or any particular audio input or inputs in general. For these reasons, the transfer function of the amplifier 102 (which may be broadly considered as the difference between its input signal and its output signal) is dynamic. Another example use which could lead to a changing amplifier transfer function is the change in an orientation of the device such as a rotation by 90, 180 or 270 degrees. When a device comprising the audio system 100 is rotated it may change the amplifier 102 settings as it may change the speaker 104 output. For example, the amplifier and speaker combination may have been configured as a high-frequency speaker ("tweeter") but, in a different orientation of the device may be automatically configured as a low-frequency speaker ("woofer") depending on the audio. Alternatively and/or additionally the speaker 104 may have been a "left" speaker and, once rotated, becomes a "right" speaker and therefore the associated amplifier 102 may receive the right stereo signal instead of the left stereo signal and, depending on how the audio signal is panned, may therefore be required to output different signal and/or frequencies. The amplifier 102 settings may therefore be automatically configured according to the speaker orientation, resulting in changes in the transfer function of the amplifier 102.

However, by sampling the audio output 103 of the amplifier 102 (e.g. it is routed, via the combiner 106, to a processor such as an external host processor), the settings of the amplifier are effectively "known", or at least may be compensated for (e.g. by an AEC algorithm running on the host processor). Thus, taking the amplifier output 103 allows for a more accurate, automatic, and dynamic echo-cancellation (compared to, for example, only using the audio input signals).

Figure 2:
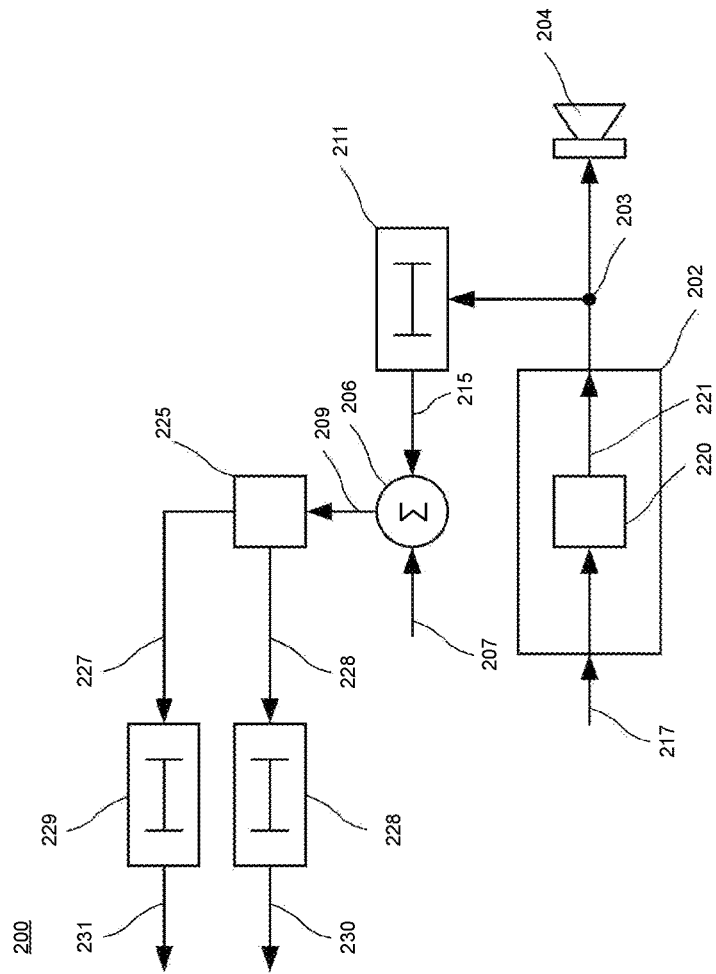
FIG. 2 is a simplified schematic block diagram of an example audio system.

Since the combined output 109 of the combiner may comprise an aggregated audio signal (comprising the amplified output audio signals of a plurality of amplifiers) there may be differing latency at each end and each stage of the chain of amplified audio signals. FIG. 2 illustrates such an example in which this latency is compensated for by a delay line.

This will be discussed later with reference to FIG. 17 but, a microphone may be configured to receive the output of the speaker (e.g. a feedback signal) and transmit the received signal to a processor, where the processor (e.g. executing instructions) performs an echo cancellation algorithm on the received signal. The audio system may comprise the microphone. The audio system may comprise the processor. Optionally, the microphone may transmit the received audio signal to another processor (e.g. a DSP) which produces a processed audio signal and transmit it to the processor which performs the echo cancellation algorithm on the processed signal. The audio system may comprise the other processor.

Here, and throughout this document, like components, features and/or elements may be denoted by like reference numerals (e.g. increased by 10, 50, or 100) and therefore the descriptions of certain elements may be omitted for brevity.

A processor, such as an external processor (which may be referred to as a host processor or more simply "host") may be configured to control (e.g. the function) of the audio system 100 and/or any component thereof, e.g. by outputting control signals. For example, it will be apparent to the skilled person that such a processor may configure the audio system 100 and/or the amplifier 102 and/or the combiner 106 by executing firmware to load runtime settings in any memory registers of the system 100, amplifier 102, or combiner 106. For example, the processor may be configured to execute firmware to load runtime settings into any memory registers of an integrated circuit (or integrated circuits) comprising the amplifier 102 and/or the combiner 106.

FIG. 2 shows an audio system 200, which may comprise the audio system 100 of the FIG. 1 example, comprising an amplifier 202 and a combiner 206, e.g. as discussed above with respect to FIG. 1. The amplifier 202 is configured to output a first amplified audio signal 203 to a speaker 204. As discussed above, the combiner 206 is configured to receive two audio signals, combine the received audio signals into a combined audio signal 209, and output the combined audio signal 209.

The FIG. 2 audio system 200 comprises a first delay line, or delay element, such as a delay unit or a delay module, indicated at 211. The first delay line 211 is configured to receive the first amplified audio signal 203 and delay it. In other words, the first delay line 211 is configured to receive the first amplified audio signal 203 and produce a delayed first amplified audio signal 215. The combiner 206 in this example is configured to receive the delayed first amplified audio signal 215 and another audio signal 207, combine the first delayed amplified audio signal 215 and the other audio signal 207 into a combined signal 209, and output the combined audio signal 209. The first delay line 211 allows the system 200 to compensate for differing latencies between other audio signals in a signal chain of which the system 200 is a part. For example, the audio signal 207 received by the combiner 206 may comprise audio signals from a previous part of a signal chain and the differing latencies between the audio signal 207 and the audio signal 203 may be compensated for by delaying the audio signal 203 by the first delay line 211. Thus, delaying an audio signal using a delay line is further example of audio signal processing.

In this example, the audio system 200 is configured to receive a first audio signal 217. The audio signal 207 may therefore be termed a second audio signal. The first audio signal 217 may be received at any location in the audio system chain. As depicted in FIG. 2, the amplifier 202 is configured to receive the first audio signal 217. The first audio signal 217 may comprise a stereo audio signal. The audio system 200 further comprises a first signal processor, such as a filter for example, indicated at 220. In the FIG. 2 example the amplifier 202 is indicated as schematically comprising the first signal processor 220 but in other examples any other part of the audio system 200 may comprise the first signal processor 220. The first signal processor 220 is configured to produce a processed audio signal 221 from the received audio signal 217 and the amplifier 202 is therefore configured to amplify the processed audio signal 221 to produce an amplified processed audio signal 203. The processed audio signal 221 may comprise a filtered audio signal and/or an equalised audio signal and/or a controller audio signal (such as a gain-controlled or loudness-controlled audio signal) etc. Of course, in examples which do not comprise such a signal processor 220 the amplified signal 203 does not comprise a processed audio signal. The signal processor 220 may be able to adaptively, or dynamically, change a property of the received audio signal 217 prior to its amplification and output to the speaker 204.

For instance, as stated above, the amplifier 202 and/or the signal processor 220 thereof may be configured and/or reconfigured on startup and/or during runtime. As also discussed above this leads to a certain unpredictability in the transfer function of the amplifier 202. Moreover, the amplifier 202 may comprise an algorithm, such as a speaker protection algorithm as discussed above and the first signal processor 220 may be configured to execute a speaker protection algorithm. More specifically, the first signal processor 220 may be configured to modify an input audio signal to produce and output a processed audio signal, wherein the processed audio signal has been generated according to a speaker protection algorithm, representing the input audio signal whose parameters are modified according to the speaker protection algorithm. This represents an example of the automatic processing of an input audio signal (e.g. according to the aforementioned algorithm) to produce a desired output (e.g. a modified output audio signal to protect the speaker) however the first signal processor 220 may modify the input audio signal in other examples as well. As discussed above however with regard to FIG. 1, any changes in the amplifier settings that result in a change in the transfer function are accounted for, e.g. by an AEC algorithm in a host processor, since the audio signal 203 output from the amplifier 202 is routed (via the combiner 106) back to a processor comprising the AEC algorithm.

Therefore, if it is determined that a certain property of the audio signal 217 needs to be changed before the audio signal is output, such as to avoid speaker damage (e.g. if the system is in a warm environment) for example, then the signal processor 220 can be configured, for example, to reduce the input transients of the audio signal 217 so that the amplified audio signal 203 does not damage the speaker 204, i.e. transducer 204.

The audio system 200 comprises a second signal processor 225 configured to receive the combined audio signal 209 output from the combiner 204, and process the combined audio signal 209 to separate the combined audio signal 209 into first and second audio sub-signals 226, 227 for example. Put another way, the second signal processor 225 is to generate two audio sub-signals 226, 227, which may each comprise a filtered signal for example, and output the first and second audio sub-signals 226, 227.

The second signal processor 225 may comprise a band-pass filter or other suitable filter for example. The filter 225 may be configured to split the combined audio signal 209 into respective low and high frequency signals. For example, the first audio sub-signal 226 may comprise a low frequency audio signal and the second audio sub-signal 227 may comprise a high-frequency audio signal. Filtering an audio signal using a filter is further example of audio signal processing and, in other examples, the second signal processor 225 may comprise any audio signal processor configured to perform any kind of audio processing (not just filtering shown in this example).

The audio system 200 also comprises two further signal processors in the form of delay lines 228, 229 (or delay elements such as units or modules etc.) in this example. The delay line 211 may be termed a first delay line 211 and the two further delay lines may be termed second and third delay lines 228, 229. Each of the further delay lines 228, 229 is configured to delay a respective one of the first and second audio sub-signals 226, 227, and output a respective first and second delayed audio sub-signal 230, 231. More specifically, the second delay line 228 is configured to receive the first audio sub-signal 226 and delay the first audio sub-signal 226 to produce a first delayed audio sub-signal 230 and output the first delayed audio sub-signal 230, and the third delay line 229 is configured to receive the second audio sub-signal 227 and delay the second audio sub-signal 227 to produce a second delayed audio sub-signal 231 and output the second delayed audio sub-signal 231. As for the delay line 211, the delay lines 228, 229 may be employed to compensate for differing latencies.

As for FIG. 1, the FIG. 2 components may be comprised in a single integrated circuit or may be provided across any number of integrated circuits, depending on the example. For instance, an integrated circuit may comprise any number or all of the components 202-231 depicted in FIG. 2 and described above.

As also stated above with respect to FIG. 1, an audio signal received by a combiner, such as the audio signal 207 received by the combiner 206, may itself comprise a combined audio signal. With reference to FIG. 2, it will also be appreciated that the audio signal may additionally or alternatively comprise a delayed audio signal. For example, audio signal 207 may comprise an amplified audio signal, a combined audio signal, a delayed amplified audio signal, or a delayed combined amplified audio signal, depending on whether the component transmitting the combined audio signal is an amplifier or a combiner and whether it is associated with a delay line (such as 211).

In one example, a plurality of amplifiers each output a respective amplified audio signal to a respective speaker. In this example, an audio signal chain may be created whereby a first combiner receives two amplified audio signals directly from respective amplifiers and generates a first combined audio signal. The first combined audio signal is output to a second combiner which is the next in the chain. The second combiner and subsequent combiners in the chain receive a combined audio signal from a previous combiner in the chain and an amplified audio signal from a respective amplifier to which they are associated, and generate and output a combined signal to the next combiner etc. The final combiner in the chain also receives a combined audio signal from a previous combiner and an amplified audio signal from a respective amplifier and generates a combined audio signal. However, rather than outputting the combined audio signal to another combiner it outputs the combined audio signal to a processor. The audio system 200 of the FIG. 2 example may represent a final audio system in such a chain, such as the final integrated circuit in such a chain. In these examples, the second filter 225 is configured to split the audio signal 209 into the two audio sub-signals 230, 231 which are then output to a processor which can perform an AEC algorithm on the two audio signals 230, 231.

In examples where a plurality of amplifier/combiner pairs are used as part of a signal chain, the audio system (e.g. a signal processor thereof which comprises the filter 220) is configured to determine the location of the amplifier with reference to the audio signal. This may be a property of the tuning of the amplifier. The delay line 211 is communicatively coupled to a signal processor such that the determined position of the amplifier/combiner pair in the signal chain can be used to set the delay of the audio signal, as the position within the audio signal chain affects the latency.

In an example, a processor (e.g. a host processor) may be configured to configure (and reconfigure) any element of the system. For example, the processor could change the tunings of one or more amplifiers of the system. The processor may also be configured to change the posture. This may effect the amplifier's position in the chain which may therefore be determined by the amplifiers themselves, or the processor directly, or the amplifier upon a property being changed by the processor. The processor, or an amplifier, may be configured to determine the location of the or each amplifier in the reference soundfield, e.g. the amplifier may be able to do this itself. In this way, any amplifiers of the system can dynamically turn on or off or have different processing applied, and they could alternatively or additionally physically move relative to the microphones (e.g. when employed in a device that has a hinge angle on a laptop or convertible). Thus, positional changes may not be limited to orientation but also on the device's configuration, or the location of one part of a device (e.g. screen) relative to another part (e.g. base).

Figure 3:
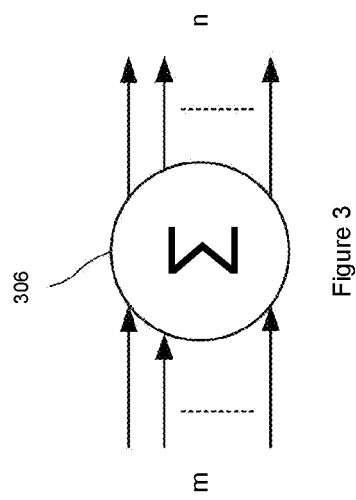
FIG. 3 is a simplified schematic block diagram of an example combiner.

FIG. 3 shows a combiner 306 which may be used in any of the example audio systems described herein. The combiner 306 is configured to receive m audio signals, combine the m received audio signals into n audio signals, and output the n signals. m and n are both non-zero positive integers with m>n and therefore the combiner 306 is configured to reduce a first number of input audio signals into a second number of output audio signals, the second number being less than the first.

With reference back to FIG. 1, the combiner 106 may be of the type depicted in FIG. 3. In this example, the audio input signal 107 depicts a first plurality of audio signals and the output 109 depicts a second plurality of audio signals. For example, if the combiner 106, is configured to accept m input audio signals, then the combiner 106 receives the first amplified audio signal at 105 and m−1 the other audio signals 107. These audio signals are combined into n audio signals, and n audio signals 109 are therefore output.

A number of the m input audio signals may be received directly from an amplifier and/or any number of the m input audio signals may be received directly from a combiner, depending on the example. Therefore, the combiner 306 may be used in conjunction with any other combiner.

As stated above, m is any positive integer and depends on the example. For instance, if the audio system 100 is part of a device such as a phone or tablet then the number of speakers may be less than, for example, if the audio system 100 is part of a room such as a home theatre or cinema room. Of course, the principles of the examples herein apply to any number of speakers.

Figure 4:
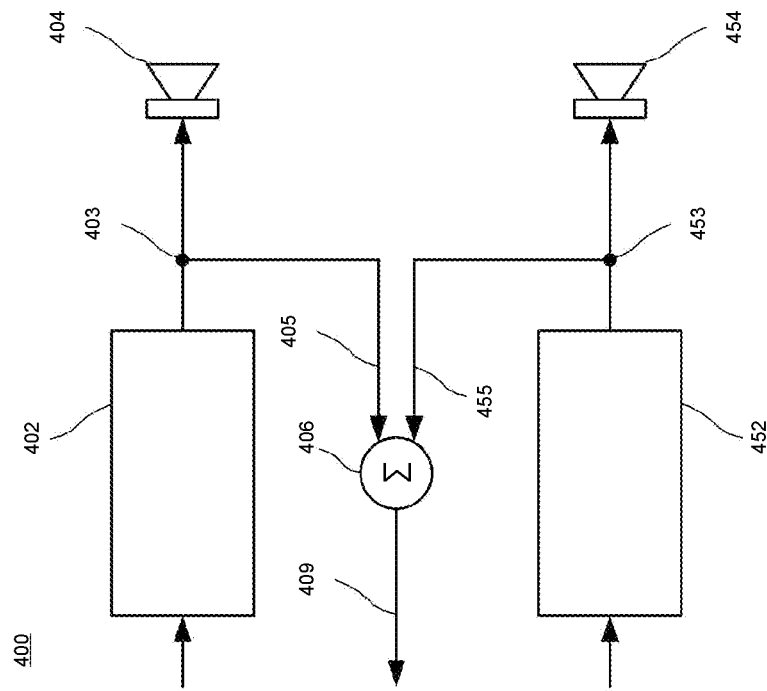
FIG. 4 is a simplified schematic block diagram of an example audio system.

FIG. 4 shows an audio system 400 which may comprise the audio systems 100 or 200 as discussed above. The audio system 400 of this example comprises a first amplifier 402 and a second amplifier 452. The first amplifier 402 is configured to output a first amplified audio signal 403 to a first speaker 404 and the second amplifier 454 is configured to output a second amplified audio signal 453 to a second speaker 454. Like the audio systems 100 and 200, the audio system 400 comprises a combiner 406. The combiner 406 of the FIG. 4 example is configured to receive the first amplified audio signal 403 from the first amplifier 402, receive the second amplified audio signal 453 from the second amplifier 452, combine the first amplified audio signal and the second amplified audio signal into a combined audio signal 409 and output the combined audio signal 409.

The FIG. 4 audio system 400 is therefore an example of an audio system comprising a plurality of amplifiers (two of which are shown in the FIG. 4 example) and a combiner configured to receive an amplified audio signal from each amplifier. Although two amplifiers are depicted, in other examples, the combiner 406 may be configured to receive other audio signals from other amplifiers (or combiners). The FIG. 4 audio system 400 shows the example of an audio system (such as that depicted in FIG. 1) where the second audio signal (107 in FIG. 1) is outputted directly from a second amplifier. As discussed elsewhere in this document, this arrangement may be used for the first two amplifiers as part of a signal chain, in which the combined audio signal 409 that is output from the combiner 406 (which is the first combiner in the chain in this example) is output to another combiner.

The combiner 406 may receive audio signals transmitted from any two amplifiers. The amplifiers whose audio signals are combined may be determined according to any required signal processing algorithm. For example, if there are a plurality of amplifiers comprising high-frequency amplifiers for specialised high-frequency speakers ("tweeters") and low-frequency amplifiers for specialised low-frequency speakers ("woofers") then according to one algorithm the amplified audio signals from two (or any other number of) tweeters may be combined by a combiner and/or the amplified audio signals from two (or any other number of) woofers may be combined by a combiner. According to another signal processing algorithm, the output from the two (or any other number of) nearest (in terms of physical distance) amplifiers may be combined by a combiner. According to yet another signal processing algorithm, the outputs from two (or any other number) of the nearest (in terms of physical distance) tweeters may be combined by a combiner and/or the amplified audio signals from two (or any other number) of the nearest (in terms of physical distance) woofers may be combined by a combiner.

Figure 5:
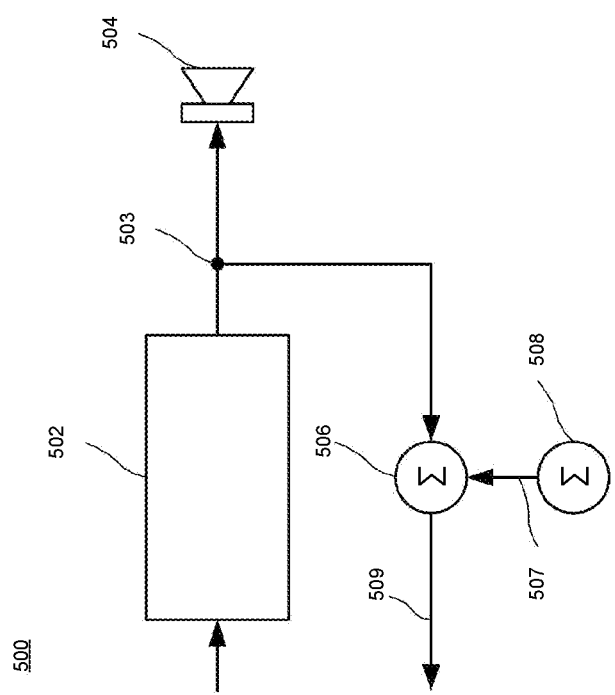
FIG. 5 is a simplified schematic block diagram of an example audio system.

FIG. 5 shows an audio system 500 which may comprise any of the audio systems as described above. The audio system 500 comprises an amplifier 502 which is configured to output a first amplified audio signal 503 to a speaker 504, i.e. transducer 504. The audio system 500 further comprises a first combiner 506 which is configured to receive the first amplified audio signal 503 from the amplifier 502 and, as for the examples above, another audio signal 507. In this example, the audio system 500 comprises a second combiner 508 and the first combiner 506 is configured to receive the first amplified audio signal from the amplifier and an audio signal 507 that is output from the second combiner 508. The second combiner 508 is itself configured to receive two audio signals (not shown), combine the two audio signals into the combined signal 507 and then output the combined audio signal 507 (which is received by the first combiner 506).

The FIG. 5 audio system 500 is therefore an example of an audio system comprising two combiners, where one combiner receives a (combined) audio signal output from another combiner, in addition to an amplified audio signal from an amplifier. As discussed elsewhere in this document, this arrangement may be used for a step in the signal chain other than the first. For example, the combiner 508 may receive an audio signal from two amplifiers (in which case the FIG. 5 example is the FIG. 6 example, to be described below, where the combiners are the first and second combiners in the signal chain), or the combiner 508 may receive its inputs from another amplifier and another combiner (in which case the audio system 500 is at an intermediate position in the signal chain).

Figure 6:
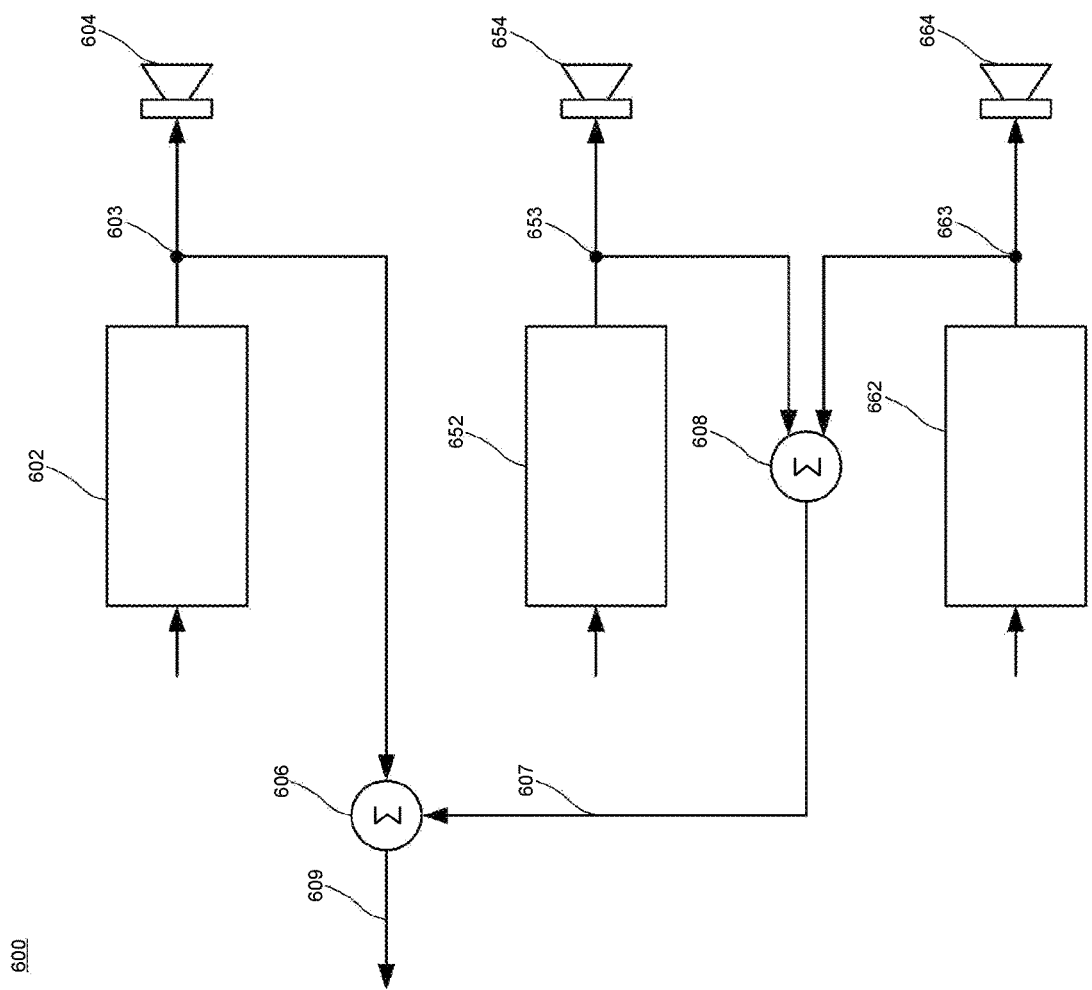
FIG. 6 is a simplified schematic block diagram of an example audio system.

FIG. 6 shows an audio system 600 which may comprise any of the audio systems 100, 200, 400, or 500 as discussed above. As will be explained below, like the FIG. 4 example, the audio system 600 comprises a combiner 608 that is configured to receive the output from two amplifiers and output a combined signal 607, and like the FIG. 5 example, the combined signal output 607 is received by another combiner 606 with the output from another amplifier 602 and combined into another combined signal 609.

More specifically, the audio system 600 of this example comprises a first amplifier 602, a second amplifier 652, and a third amplifier 662. The first amplifier 602 is configured to output a first amplified audio signal 603 to a first speaker 604, the second amplifier 652 is configured to output a second amplified audio signal 653 to a second speaker 654, and the third amplifier 662 is configured to output a third amplified audio signal 663 to a third speaker 664. The audio system 600 further comprises a first combiner 606 and a second combiner 608. The second combiner 608 is configured to receive the second amplified audio signal 653 from the second amplifier 652, at 655, receive the third amplified audio signal 663 from the second amplifier 662, at 665, combine the second amplified audio signal 653 and the third amplified audio signal 663 into the combined signal 607, and output the combined signal 607 to the first combiner 606. The first combiner 606 is configured to receive the first amplified audio signal 603 from the first amplified, at 605, receive the combined audio signal 607 output from the second combiner 608, combine the first amplified audio signal and the combined audio signal 607 into the combined audio signal 609, and output the combined audio signal 609.

As discussed elsewhere in this document, this arrangement may be used for the first three amplifiers as part of a signal chain, in which the combined signal 608 comprising the first and second amplified audio signals is output to another combiner 606 etc.

Figure 7:
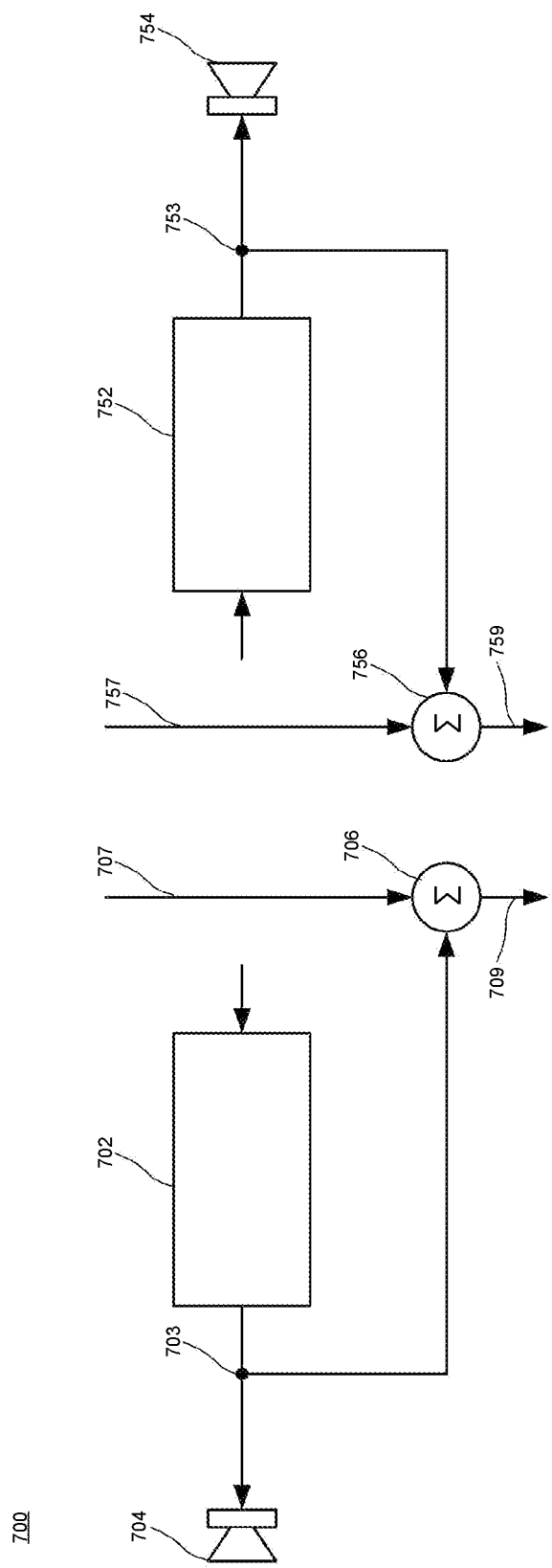
FIG. 7 is a simplified schematic block diagram of an example audio system.

FIG. 7 shows an audio system 700 which may comprise any of the audio systems 100, 200, 400, 500, or 600 as discussed above. The audio system 700 of this example comprises a first amplifier 702 and a second amplifier 752, a first combiner 706, and a second combiner 756. The first amplifier 702 is configured to output a first amplified audio signal 703 to a first speaker 704 and the second amplifier 752 is configured to output a second amplified audio signal 753 to a second speaker 754. The first combiner 706 is configured to receive the first amplified audio signal 703 from the first amplifier 702, at 705, and receive another audio signal 707, combine the first amplified audio signal 703 and the other audio signal 707 into a first combined audio signal 709, and output the first combined audio signal 709. The second combiner 756 is configured to receive the second amplified audio signal 753 from the second amplifier 752, at 755, and receive another audio signal 757, combine the second amplified audio signal 753 and the other audio signal 757 into a second combined audio signal 759, and output the second combined audio signal 759.

Some of the examples herein may be used to combine any number of audio signals into one audio signal (e.g. one final audio signal output by a combiner to a host processor). FIG. 7 depicts an example where any number of audio signals (greater than four) are combined into two audio signals. According to FIG. 7, a (not-shown) processor receives two combined audio signals as inputs, from the combiners 706 and 756. In the FIG. 7 example, the combiners 706 and 756 are the final two combiners in two separate series, or sets or chains etc., of audio signal. The audio signals input into each respective combiner 706, 756 may (as described above) be amplified signals directly received from a respective amplifier (as explicitly shown in FIGS. 4 and 6; the combiners 706 and 756 of FIG. 7 thereby being analogous to the combiner 406 of FIG. 4 or the combiner 608 of FIG. 6). Alternatively, the audio signals input into each respective combiner 706, 756 may (as described above) be combined signals received from a combiner (as explicitly shown in FIGS. 5 and 6; the combiners 706 and 756 thereby being analogous to the combiner 506 of FIG. 5 or the combiner 606 of FIG. 6).

Figure 8:
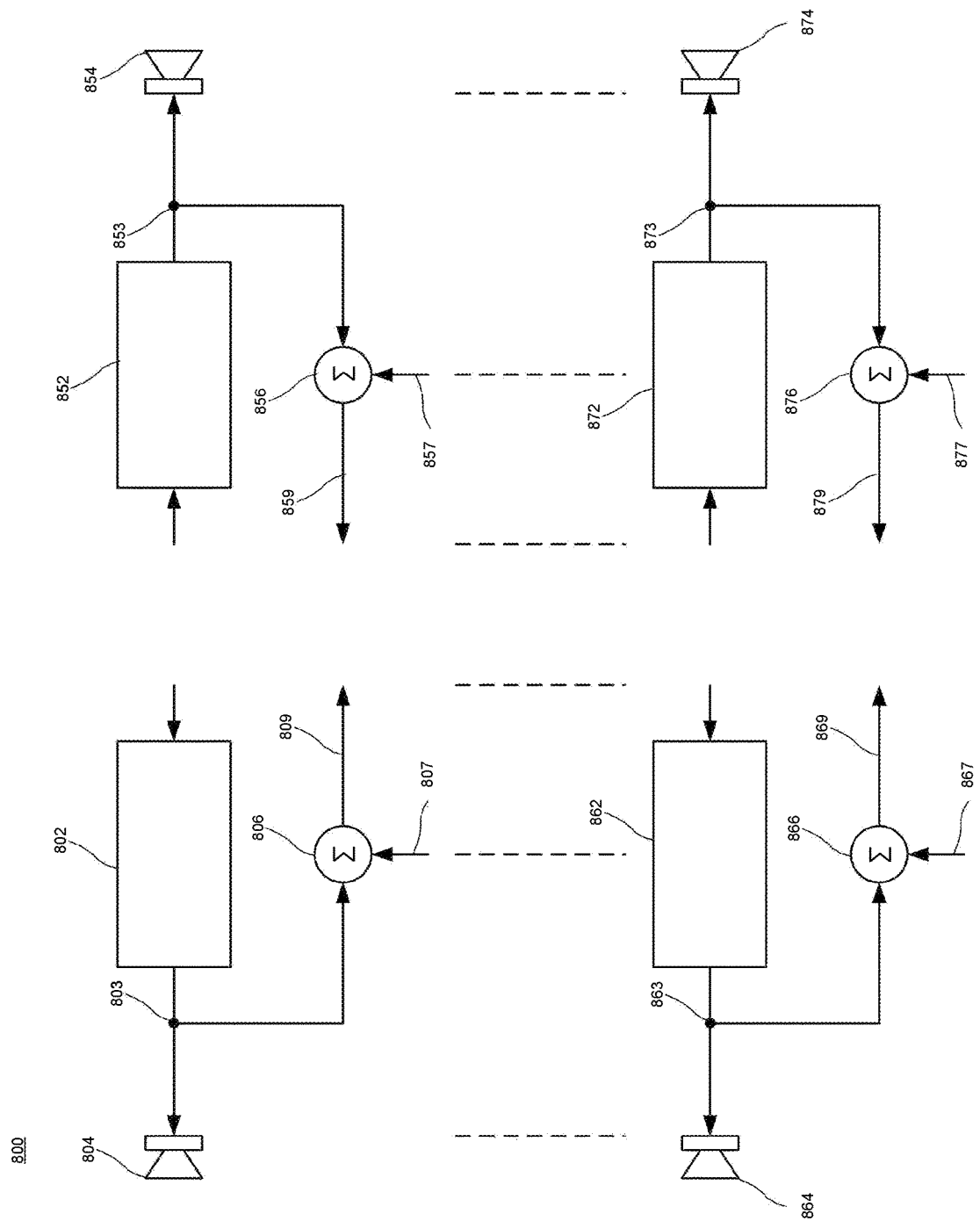
FIG. 8 is a simplified schematic block diagram of an example audio system.

FIG. 8 shows an audio system 800 which may comprise any of the audio systems 100, 200, 400, 500, 600, or 700 as discussed above. The audio system 800 comprises a plurality of amplifiers 802-872 and a plurality of combiners 806-876. More specifically, in the audio system 800 each amplifier is associated with a respective combiner. The audio system 800 therefore comprises a plurality of amplifier-combiner pairs. Four are explicitly shown for illustrative purposes only but as indicated in FIG. 8, any number of amplifiers and respective combiners may be provided. Each amplifier 802-872 is configured to output a respective amplified audio signal 803-873 to a respective speaker 804-874. Each combiner 806-876 is configured to receive a respective amplified audio signal 803-873 from its respective amplifier 802-872, at 805-875, respectively, receive another respective audio signal 807-877, combine the respective received amplified audio signal 803-873 and other audio signal 807-877 into a respective combined audio signal 809-879, and output the combined signal 809-879.

The FIG. 8 audio system 800 therefore an example of an audio system comprising a plurality of amplifiers and a plurality of combiners, wherein each amplifier in the plurality is associated with a respective combiner, the respective combiner of each amplifier in the plurality being configured to receive an amplified audio signal output from its respective amplifier in the plurality, receive another audio signal received from another amplifier or another combiner, combine the received audio signals into a combined audio signal, and output the combined audio signal.

In FIG. 8, each combiner 806-876 receives an amplified audio signal from a respective amplifier 802-872 and a further audio signal 807, 877, and outputs a combined audio signal 809-879. As discussed above for the other audio systems, depending on the example, the further audio signal may be received from either another amplifier or another combiner.

In a first example, each amplifier/combiner pair may be connected to each other in series forming a single audio signal chain, with one amplifier/combiner pair being the first in the chain (that combiner receiving its further audio signal from another amplifier) and one amplifier/combiner pair being the final in the chain (that combiner outputting its combined signal to a processor). In this example, the plurality of signals is reduced to one final audio output.

In a second example, a first subset of the amplifier/combiner pairs may be connected to each other in series forming a first audio signal chain, and a second subset of the amplifier/combiner pairs may be connected to each other in series forming a second audio signal chain. The amplifier/combiner pairs in this example are as shown in FIG. 7. The plurality of signals is therefore reduced to two final audio outputs in this example. Therefore, each subset of the amplifier/combiner pairs comprises a first pair in the chain (that combiner receiving its further audio signal from another amplifier) and a final pair in the chain (that combiner outputting its combined signal to a processor, being one of the two final outputs) etc.

The skilled person would appreciate that any audio system described above may comprise any additional component or components, such as any of the components shown in and described with reference to FIG. 2. For example, where a plurality of amplifier/combiner pairs are connected together in series, any one of the amplifier/combiner pairs in the series may take the form of the audio system 200 and may therefore comprise the first and/or second filter and/or any of the delay lines etc.

Figure 9:
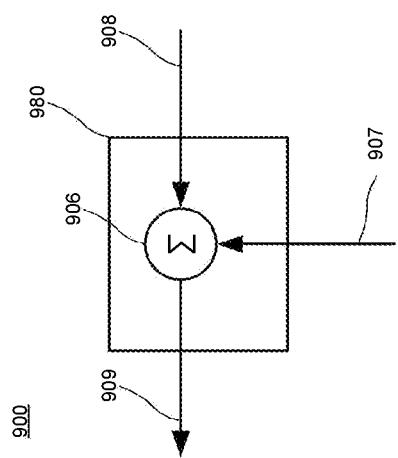
FIG. 9 is a simplified schematic block diagram of an example audio system component comprising a combiner.

FIG. 9 shows an audio system component 980 that comprises a combiner 906. The audio system component 980 may be employed in any of the audio systems 100, 200, 400-800 described above in which example the combiner 906 may be used as any of the combiners 106-876 as described above. As for the combiners described above, the combiner 906 is configured to receive first and second audio signals 907, 908, combine them to generate a combined signal 909 and output the combined signal 909.

Depending on the example, the component 980 may comprise a codec or processor, such as a DSP or host processor etc., or integrated circuit. Therefore, the combiner 906 of the FIG. 9 example may be used as the combiner in any of the previous Figures, in which case the combiner may be provided as part of a different component to the amplifier. For example, an amplifier may be part of a first integrated circuit and its associated combiner (configured to receive a signal from the amplifier) may be part of a second integrated circuit.

Figure 10:
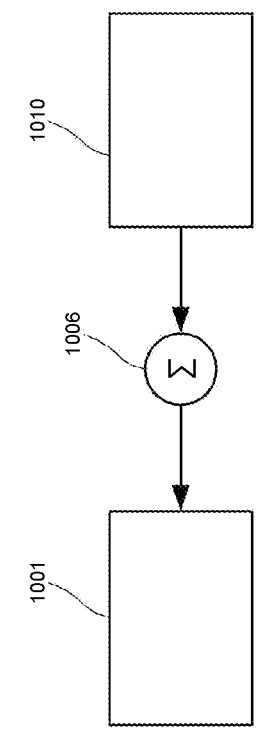
FIG. 10 is a simplified schematic block diagram of an example audio system.

FIG. 10 depicts an example audio system 1000 which may comprise any of the audio systems as described above. The audio system 1000 comprises a processor 1001 which may comprise a DSP. The processor 1001 may be configured to output one or more audio signals and receive one or more input audio signals. The output audio signal may comprise a stereo audio signal containing audio to be amplified by one or more amplifiers and output by one or more speakers. The audio signals received by the processor 1001 may comprise a feedback and/or reference and/or echo-cancellation signals. The processor 1001 may be configured to receive two input audio signals in some examples. The processor 1001 may comprise AEC hardware and/or firmware and/or software. For example, the processor 1001 may be configured to execute instructions that cause the processor to perform an AEC algorithm on any received audio signals. The one or more input signals received by the processor are output from a combiner 1006. Block 1010 is a schematic block representing at least two audio signals (to be combined by the combiner 1006). Block 1010 may comprise any number of amplifiers and combiners according to any one or more of the arrangements discussed above. For example, block 1010 may comprise any of the audio systems described above with reference to FIGS. 1, 2, and/or 4-9. The combiner 1006 may comprise the combiner of FIG. 3 (in which case the processor 1001 is configured to receive n inputs) and/or FIG. 9 (in which case the combiner 1006 is part of a separate component and/or integrated circuit and received a plurality of audio signals from block 1010).

FIGS. 11-14 will now be described. As stated above, the example audio systems 100-1000 could be distinct components or provided on one integrated circuit. FIGS. 11-14 depict such example integrated circuits illustrating their architecture in more detail. In these figures, solid lines depict audio signals whereas dotted lines depict any form of general coupling.

Figure 11A:
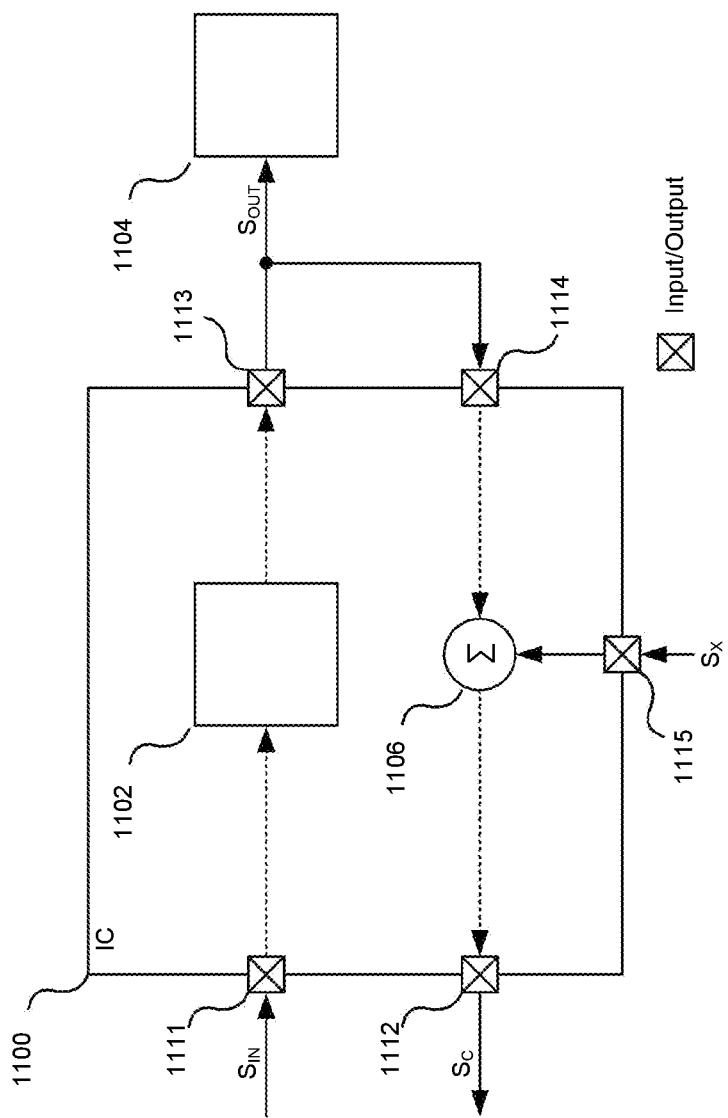

FIG. 11a shows an integrated circuit ("IC") 1100 comprising an amplifier 1102 and a combiner 1106. The IC 1100 is shown in association with a speaker 1104, i.e. transducer. The IC 1100 further comprises input terminals or nodes 1111, 1114, and 1115 and output terminals or nodes 1112 and 1113. The amplifier 1102 and combiner 1106 may be as discussed above with respect to FIGS. 1-10. The IC 1100 is configured to receive a first audio signal $S_{IN}$ at the input terminal 1111 and transmit the audio signal to the amplifier 1102. The audio signal may be modified by one or more signal processing steps, e.g. by one or more audio signal processors of the IC 1100, such as those discussed above or at the amplifier 102. The amplifier 1102 is configured to amplify the audio signal $S_{IN}$ or a representation thereof and the IC 1100 is configured to transmit the amplified audio signal $S_{OUT}$ to the speaker 1104 via the output terminal 1113. The IC 1100 is configured to receive the amplified signal $S_{OUT}$ at the input terminal 1114 and transmit the amplified signal $S_{OUT}$ to the combiner 1106. The IC 1100 is configured to receive a second audio signal $S_X$ at the input terminal 1115 and configured to transmit the signal $S_X$ to the combiner 1106. The combiner 1106 is configured to combine the audio signals $S_{OUT}$ and $S_X$ into a combined audio signal $S_C$ and the IC is configured to transmit the combined audio signal $S_C$ at the output terminal 1112.

The IC 1100 may be used in combination with other ICs of the same configuration. For example, the second audio signal $S_X$ may be a combined audio signal output from another IC (in other words, a combined output signal $S_{C1}$ from a first IC may be the second audio signal $S_{X2}$ of a second IC etc.). Alternatively, the second audio signal $S_X$ may be the output Spun from a second amplifier.

Figure 11B:
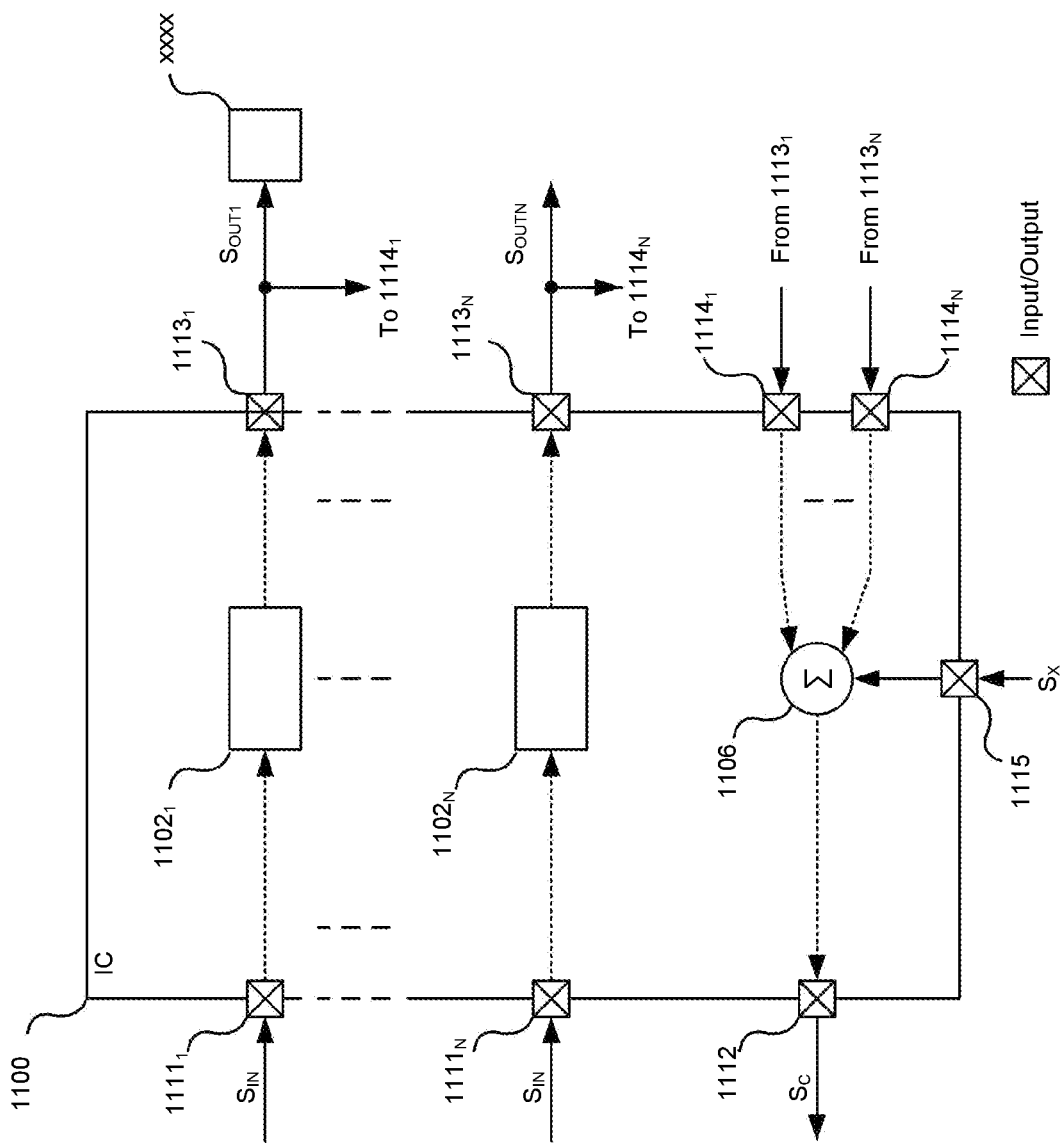

FIG. 11b shows an integrated circuit ("IC") 1100b. Like the IC 1100a of the FIG. 11a example, the IC in the FIG. 11b example comprises a plurality of amplifiers $1102_{1-N}$. Each amplifier $1102_{1-N}$ is configured to receive, amplify, and output a respective audio signal such that the IC 1100b is configured to receive, amplify, and output a plurality of audio signals as follows. The IC 1100b comprises a plurality of input terminals $1111_{1-N}$ and a plurality of output terminals $1113_{1-N}$. Each input and output terminal is associated with a respective amplifier in the plurality. As such, the IC 1100b is configured to receive a plurality of audio signals $S_{IN1-N}$, each received at a respective input terminal 1111, and transmit each audio signal to a respective amplifier $1102_{1-N}$. As described above for FIG. 11a, each audio signal may be modified by one or more signal processing steps, e.g. by one or more audio signal processors of the IC 1100, such as those discussed above, or at each amplifier 102.

Each amplifier 1102 is configured to amplify the audio signal $S_{IN}$ that it receives (or a representation thereof) and the IC 1100 is configured to transmit each amplified audio signal $S_{OUT}$ to a respective speaker $1104_{1-N}$ via a respective output terminal $1113_{1-N}$. The IC 1110 further comprises input terminals $1114_{1-N}$ and 1115, and a combiner 1106. At each of the input terminals $1114_{1-N}$ the IC 1100 is configured to receive a respective amplified signal $S_{OUT1-N}$ and transmit them to the combiner 106. At the input terminal 1115 the IC 1100 is configured to receive a further audio signal $S_X$ (or, in some examples, a plurality of further audio signals $S_X$) and combine the audio signals $S_{OUT}$ and $S_X$ into a combined audio signal $S_C$. The IC 1100c is configured to transmit the combined audio signal $S_C$ at the output terminal 1112.

FIG. 11b therefore depicts an IC that is configured to accept a first number of audio signals, $SOUT_{1-N}$ and $S_X$, and combine the signals into a second number of audio signals $S_C$ (the second number being less than the first), which the IC 1100b is configured to output at 1112. Although the input signals $S_{IN}$ are denoted by the same reference numeral it will be appreciated that, for this example and other examples, in practice some or all of these audio signals may be different, and indeed some may be the same, the precise nature depending on the implementation.

Figure 11C:
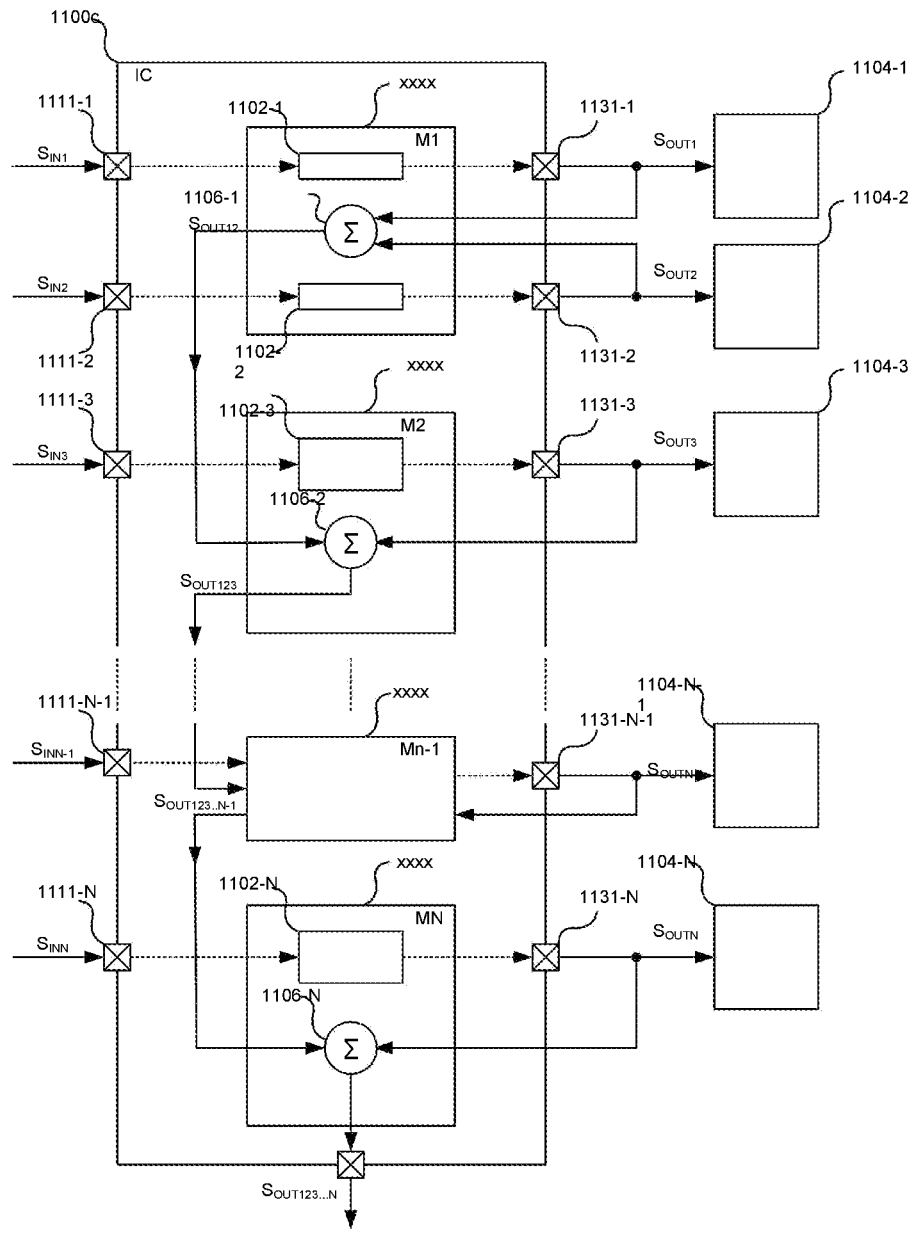

FIG. 11c shows an IC 1100c. Like the FIG. 11b example, the IC 1100c is configured to accept multiple audio inputs and combine them into a reduced number of audio outputs (either into a single audio output or to a second, lesser, number of audio outputs). Like the IC 1100b, the IC 1100c is configured to receive a plurality of input audio signals $S_{IN1-N}$, each received at a respective input terminal $1111_{1-N}$. Like the IC 1100b, the IC 1100c is configured to transmit each received input audio signal to a respective amplifier $1102_{1-N}$, where each amplifier $1102_{1-N}$ is configured to amplify the received audio signal and the IC 1110c, via a respective output port $1131_{1-N}$, is configured to transmit each amplified audio output signal $SOUT_{1-N}$ to a respective speaker $1104_{1-N}$.

Whereas the IC 1100b of the FIG. 11b example comprised one combiner configured to directly receive the plurality of amplified audio outputs $S_{OUT1-N}$, the IC 1100c of the FIG. 11c example comprises a plurality of combiners $1106_{1-N}$. Each combiner is configured to combine received audio signals into a combined signal and output the combined signal. As will now be explained, the IC 1100c combines multiple audio signals as part of a signal chain, with each combiner except the first combiner 1106-1 in the chain receiving an audio signal from a respective amplifier and a previous combiner in the chain, combining those signals into a combined signal, and outputting the combined signal to the next combiner in the chain. The first combiner 1106-1 in the chain receives two audio signals from the first two amplifiers in the chain. All combiners except the final combiner 1106-N in the chain output their combined signals to the next combiner in the chain, with the IC 1110c outputting the final combined signal from the final combiner via the output terminal 1115.

The ICs 1100b,c may therefore may be used in a device, or in association with a device, comprising the speakers $1104_{1-N}$. The ICs 1100b,c may therefore be used in an audio signal chain to enable multiple input audio signals to be output by a plurality of speakers while providing for echo cancellation.

The IC 1100c schematically takes a structure in which certain amplifier-combiner pairs may be considered as "modules" of the IC as will now be described. These modules may be regarded as physical modules in that the components of the modules may be located proximate one another, or, alternatively or additionally may be regarded as physical, separate, units that may be installed on the IC. Of course, the "modules" may also be regarded as for purely illustrative purposes only to illustrate the functioning of the IC 1100c as will now be described.

A first module M1, in a series of N modules, representing the beginning of an audio signal chain comprises first and second amplifiers $1102_1$ and $1102_2$ and a first combiner $1106_1$. The combiner $1106_1$ is configured to receive the amplified audio signals that are output from each of the amplifiers $1102_1$, $1102_2$, these signals being $S_{OUT1}$ and $S_{OUT2}$. The combiner $1106_1$ of the first module is configured to combine the signals $S_{OUT1}$ and $S_{OUT2}$ into a combined signal $S_{OUT12}$ and transmit the combined signal $S_{OUT12}$ to the next combiner $1106_2$ in the signal chain, which is the combiner $1106_2$ of the next module M2 in the chain.

Two "intermediate" modules of the IC 1100c are shown, labelled M2 and MN−1. As indicated by the dots, the IC 1100c may comprise any number of modules, and any number of intermediate modules. Each intermediate module comprises an amplifier and a combiner. Each combiner in the intermediate module is configured to receive an audio signal from the previous combiner (in the previous module) and an audio signal output from the amplifier in the module with which it is associated. The combiner is configured to combine the two audio signals into a combined signal and output the combined signal to the next combiner (in the next module) in the signal chain. The functioning of each intermediate module is identical and will now be described with specific reference to M2. The combiner $1106_2$ is configured to receive the combined audio signal $S_{OUT12}$ from the previous combiner $1106_1$ in the previous module M1 and the amplified audio signal $S_{OUT3}$ amplified by the amplifier $1102_3$ in the same module as the combiner $1106_2$. The combiner $1106_2$ is configured to combine the signals $S_{OUT12}$ and $S_{OUT3}$ into the combined signal $S_{OUT123}$ and transmit the combined signal $S_{OUT123}$ to the next combiner $1106_3$ in the next module M3, etc.

The final module MN is identical to the intermediate modules in all respects other than, due to the configuration and placement of this module within the IC 1100c, the combiner $1106_N$ of this module is configured to output its combined signal to the output terminal 1115 where the IC 1100c outputs the final combined signal in the signal chain. Specifically, the combiner $1106_N$ is configured to receive the amplified audio signal $S_{OUTN}$ from the amplifier $1102_N$ in the module MN, receive the combined output $S_{OUT123\ldots N-1}$ from the previous combiner $1106_{N-1}$ in the previous module $M_{N-1}$ (which, as the subscript denotes, comprises all previous amplified audio signals), combine the signals into the combined signal $S_{OUT1\ldots N}$ and the IC 1100c is configured to output the combined output signal $S_{OUT123\ldots N}$ via the output terminal 1115.

Like the FIG. 11b example, the IC 1100c may therefore be used in an audio signal chain to enable multiple input audio signals to be output by a plurality of speakers while providing for echo cancellation.

Figure 11D:
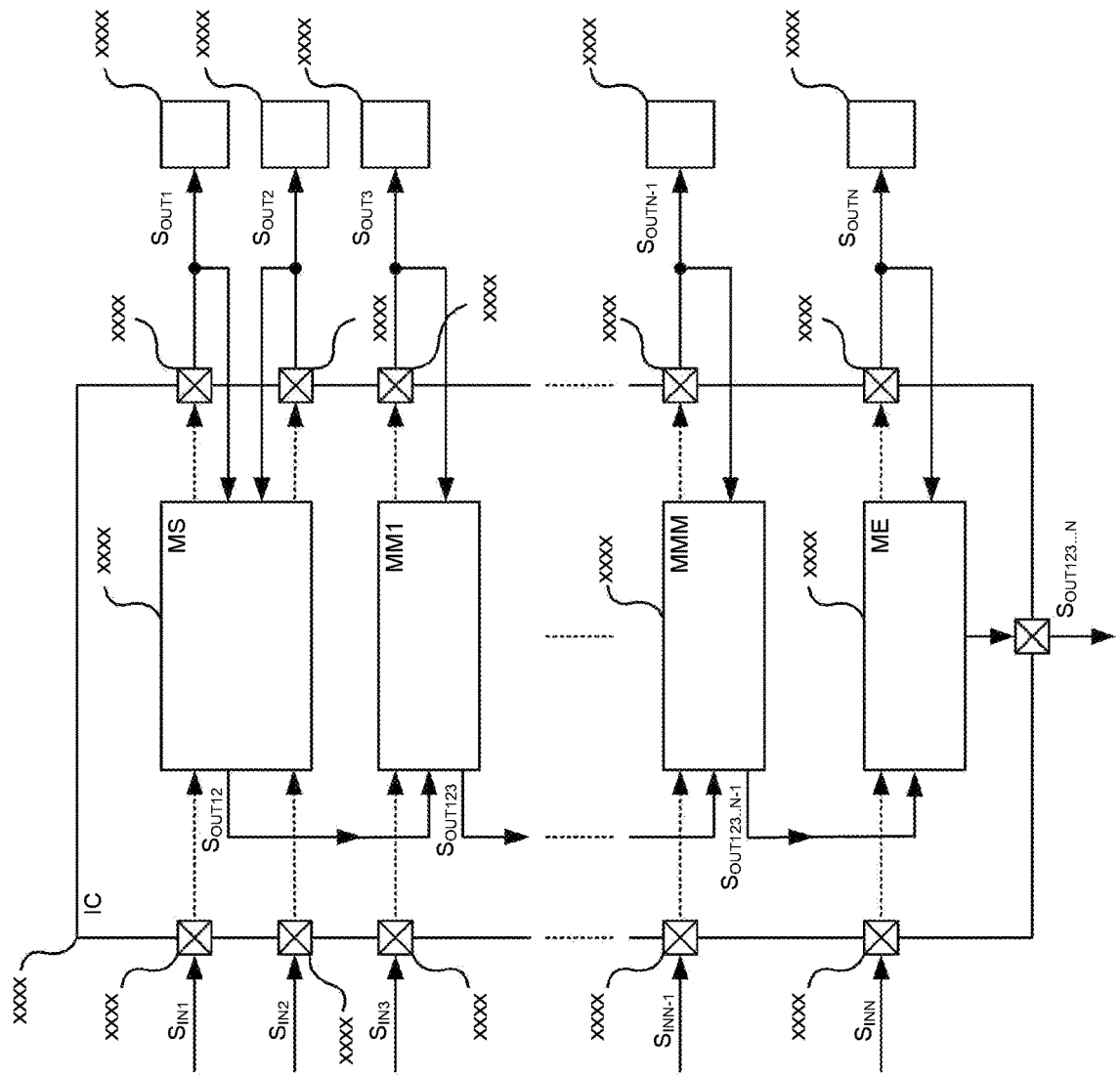

FIG. 11d shows the modular arrangement of the IC 1100c in more schematical detail.

Figure 11E:
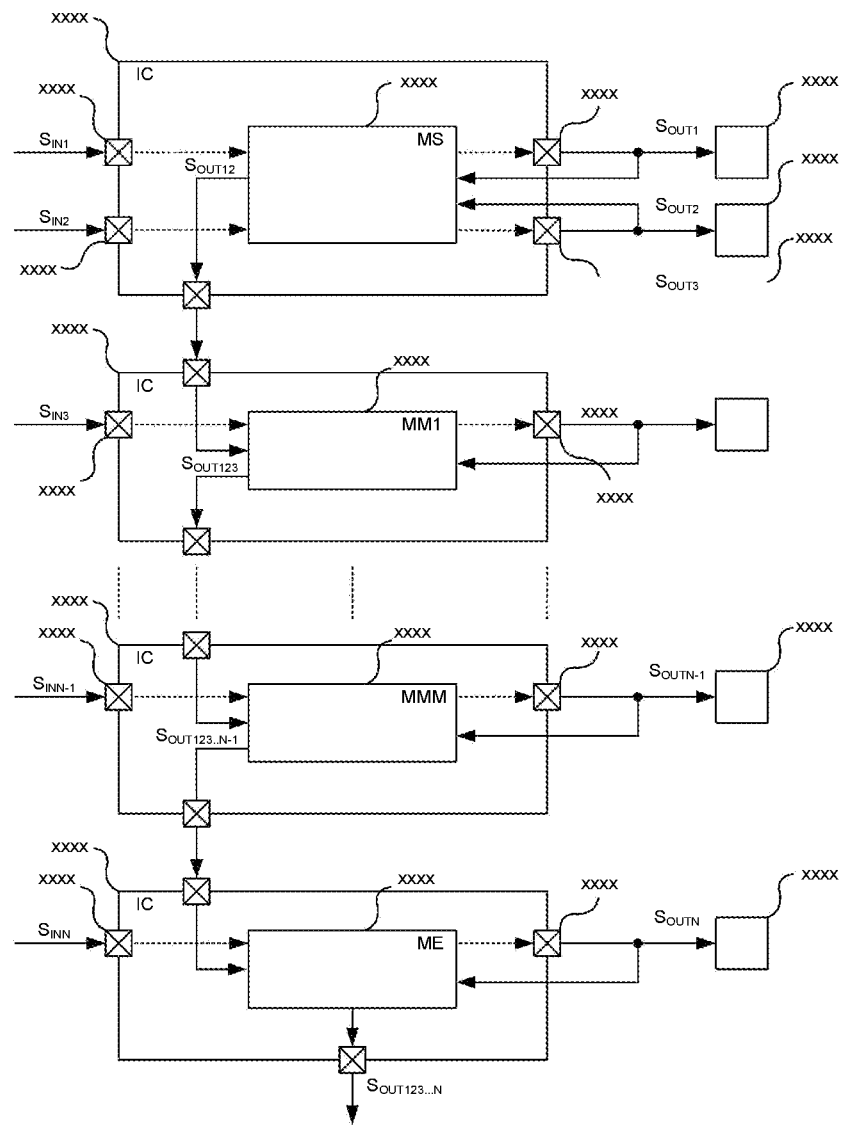

FIG. 11e shows a plurality of ICs, $1100_1$-$1100_N$, which will together be referred to as a system. The system depicted in FIG. 11e functions identically to the IC 1100c of the FIG.

11c example except that each module (including the start module M1, end module MN, and intermediate modules) are provided on their own IC. Therefore, whilst an identical signal chain is created by the FIG. 11e system as for the FIG. 11c IC 1100c, in FIG. 11e the signal chain comprises a plurality of ICs $1100_{1-N}$.

Each module M1-MN is as described above for FIG. 11c. Therefore, the IC $1100_1$ is a first IC in the signal chain at which two amplified audio signals are combined and output to the next IC $1100_2$ in the signal chain. The first IC $1100_1$ comprises two input audio terminals $1111_1$ and $1111_2$, and three audio output terminals $1131_1$, $1131_2$ and $1115_1$. At $1131_1$ and $1131_2$ the amplified audio signals are output from respective amplifiers (the two amplifiers in the first module M1, being the first amplifiers in the signal chain). The first IC $1101_1$ differs in structure to the remaining ICs, which comprise one audio input terminal 1111 and two audio output terminals including an audio output terminal 1131 at which the amplified audio signal is output from the amplifier of the module and a further output terminal 1115 at which the combined signal, generated by the combiner of the module, is output either to the next combined/module/IC in the signal chain (for an intermediate IC) or to a processor (to the final IC $1100_N$) in the signal chain. The system of ICs $1100_{1-N}$ may be employed for the same purpose as the IC 1100c as described above.

The examples of FIGS. 11c-e depict a plurality of signals being combined into a single output, as the result of multiple amplifier/combiner pairs being connected in series. It will be appreciated that, in some examples, two or more such series of signals may be provided. In these examples a plurality of signals may be combined into multiple outputs depending on how many series of signals are provided. For example, if two ICs or systems according to FIGS. 11c-e are provided, then a plurality of signals may be combined into two audio outputs. This may be used in examples where a processor is configured to receive two audio inputs for echo cancellation.

FIG. 12 shows an IC 1200 comprising an amplifier 1202, a combiner 1206, and terminal or nodes 1211-1215 which are as discussed above with respect to FIG. 11. The IC 1200 additionally comprises a signal processor 1220 and a delay unit 1211. The signal processor 1220 may be as described above with respect to the first filter 220 and the delay unit 1211 may be as described above with respect to the delay line 211 of the FIG. 2 example. The IC 1200 of this example is therefore configured to receive an input audio signal $S_{IN}$ and transmit the audio signal $S_{IN}$ or a representation thereof to the signal processor 1220. The signal processor 1220 is configured to process the input audio signal $S_{IN}$ or a representation thereof prior to its amplification by the amplifier 1202. The signal processor 1220 is configured to output a processed audio signal to the amplifier 1202. This may be done if, for example, it is determined that changes to the audio signal $S_{IN}$ are needed prior to its output, e.g. to protect the speaker 1204 for example. The delay unit 1211 may be configured to receive the amplified signal $S_{OUT}$ at the terminal 1214, delay the signal, and transmit a delayed signal to the combiner 1206.

FIG. 13 shows an IC 1300 comprising an amplifier 1302, a combiner 1306, and terminals or nodes 1311-1315 which are as discussed above with respect to FIGS. 11 and 12, and a signal processor 1320 and delay unit 1311 as discussed above with respect to FIG. 12. The IC 1300 additionally comprises and analogue to digital converter (ADC) 1330 to convert the analogue signal $S_{OUT}$ received at terminal 1314 prior to its delay by the delay unit 1311. In examples where the signal output by the amplifier 1302 is a digital signal then the IC 1300 may additionally comprise a digital to analogue converter (DAC) 1325 to convert the digital signal to an analogue signal prior to its output at 1313. In examples comprising the DAC 1325 the amplifier 1302 is configured to transmit an amplified signal to the DAC 1325 and the signal $S_{OUT}$ comprises a converted signal. The ADC 1330 is configured to receive the signal $S_{OUT}$ from the terminal 1314 and covert the signal $S_{OUT}$, transmit the converted signal to the delay unit 1311 which is configured to delay the converted signal and output a delayed converted signal to the combiner 1306.

FIG. 14 shows an IC 1400 comprising an amplifier 1402, a combiner 1406, and terminal 1411-1415 which are as discussed above with respect to FIGS. 11-13, a signal processor 1420 and delay unit 1411 as discussed above with respect to FIGS. 12 and 13, an ADC 1430 and optional DAC 1425. In the FIG. 14 example, the signal processor 1420 comprises the combiner 1406 and the delay unit 1411, although in other examples it may comprise the combiner 1406 and the delay unit 1411 may be a separate component (as for FIGS. 12 and 13). The signal processor 1420 may also comprise the ADC 1430. In this example therefore the signal processor 1420 is configured to: receive the audio input signal $S_{IN}$ or a representation thereof, process the audio signal $S_{IN}$, transmit the processed audio signal to the amplifier, receive a converted audio signal from the ADC 1430, (in examples where the signal processor comprises the delay unit 1411) delay the converted audio signal received from the ADC 1430 and output the delayed converted audio signal to the combiner 1406, receive the audio signal $S_X$, combine the audio signal $S_X$ with the delayed converted audio signal, and output the combined audio signal $S_C$.

Figure 15A:
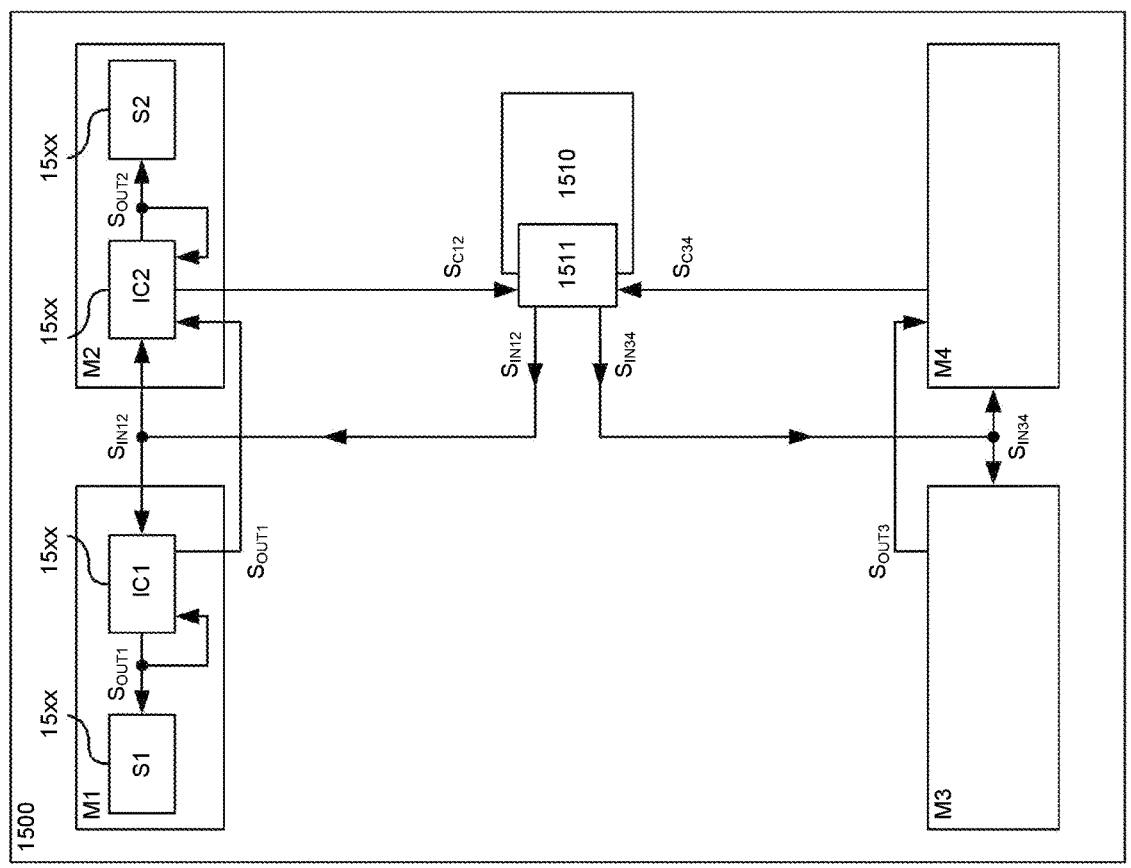
Figure 15C:
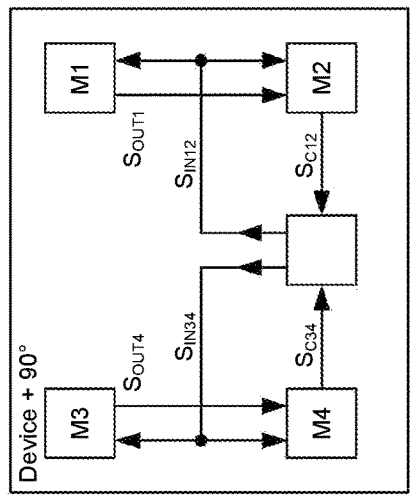
Figure 15E:
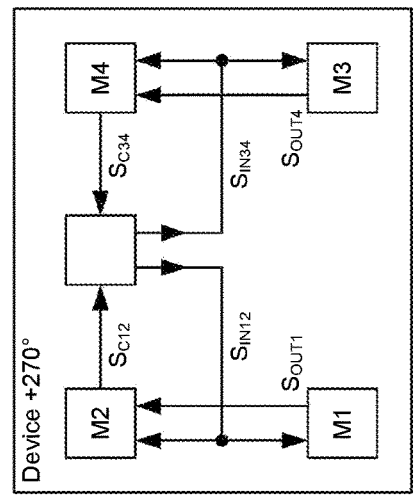
Figure 15B:
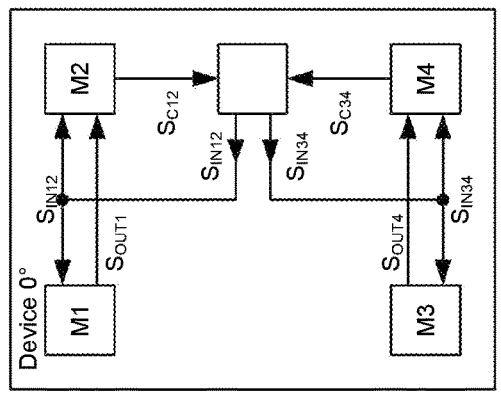
Figure 15D:
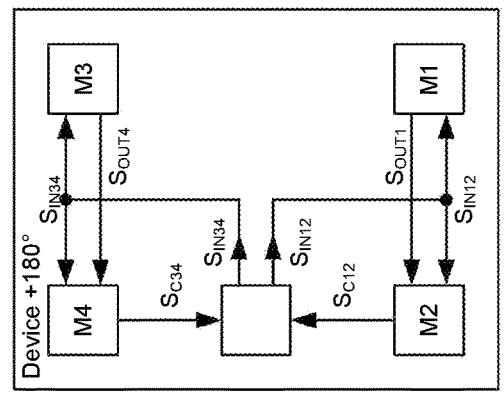

FIG. 15a shows a device 1500 which comprises a processor 1510 (which may be referred to as a host processor) in association with four modules M1-M4. Each module, to be described below, may be provided on its own printed circuit board (PCB) or any number of PCBs (including any number of modules being provided on one PCB). The PCB is just one example of a substrate to which the modules may be mechanically mounted and electrically connected, other rigid or flexible substrates will be apparent to those of ordinary skill in the art. The processor 1510 comprises an input/output interface 1511 having two input terminals, each configured to receive an input audio signal (e.g. for echo cancellation) and two output terminals, each configured to output an audio signal (e.g. for amplification and for outputting by the speakers of the modules). Therefore, the audio outputs of the processor 1510 are the audio inputs to the modules. In this example, the audio outputs of the processor 1510 are labelled $S_{IN12}$ and $S_{IN34}$. Each one of $S_{IN12}$ and $S_{IN34}$ may comprise a stereo (left and right) signal such that identical audio signals are sent to each pair of modules M1, M2 and M3, M4, with one of each module in the pair outputting one of the left or right mono signals and the other module in the pair outputting the other mono signal.

The components of the modules labelled M3 and M4 have been omitted for brevity; the skilled person will understand that they are respectively identical to the modules labelled M1 and M2 as will now be described.

Each module comprises a speaker and an IC. The IC, IC1, of the first module M1 (and therefore also the IC of the third module M3 etc.) comprises an amplifier, whereas the IC, IC2, of the second module M2 (and therefore also the IC of the fourth module M4 etc.) comprises an amplifier and a combiner. The IC, IC1, of module M1 receives the audio signal $S_{IN12}$, amplifies it, sends the amplified signal $S_{OUT1}$ to the speaker S1 and to the IC, IC2, of the second module M2. The IC, IC2, of the module M2 comprises a combiner and the combiner receives the amplified audio signal $S_{OUT1}$ output from the first module M1. The IC2 also receives the audio signal $S_{IN12}$, amplifies it, sends the amplified signal $S_{OUT2}$ to the speaker S2 and to the combiner of the IC, IC2. The combiner combines the signals $S_{IN12}$ and $S_{OUT2}$ into the combined signal $SC_{12}$, and outputs the combined signal $S_{C12}$ which is received by the input/output interface 1511 of the processor 1500. The processor 1500 may then perform an echo cancellation on the received signal $SC_{12}$. Similarly, the processor 1500 receives another combined signal $S_{C34}$ and therefore the device 1500, via the modules M1-M4 is able to achieve: (i) the amplification of an audio signal through multiple speakers (four in this example); and (ii) echo cancellation for the multiple audio signals despite the host processor only being configured to accept two audio inputs, the reduction in the number of audio signals from four to two being possible through the use of two combiners, each provided in one of the modules M2 and M4.

As stated above with regards to FIGS. 1 and 2, an audio signal may be processed prior to its amplification and output by the speaker, resulting in a dynamic (and therefore unpredictable) transfer function. For the device 1500 of FIG. 15a, each module may comprise a signal processor, and this may be part of the IC of the module or may be provided as a separate component on the PCB. As also stated above, the processing of the audio signal may depend on user-programmed settings or on dynamic settings. One such example of dynamic settings is that each speaker may be configured differently depending on the orientation of the device.

FIGS. 15b-e depict different the device of FIG. 15a in multiple rotational orientations, indicating how the function of certain modules, amplifiers, combiners, and speakers may change depending on the orientation. The host processor 1510 is able to determine the function of each speaker in dependence on the position (e.g. rotational position relative to the earth), for example based on internal gyroscopes and/or accelerometers etc. The device may be configured such that the top (with regards to its orientation with respect to the earth) speakers are configured as tweeters and the lower speakers are configured as woofers. In the FIG. 15b orientation speakers S1 and S2 are therefore configured as tweeters and speakers S3 and S4 (of modules M3 and M4) are configured as woofers, whereas in the FIG. 15e orientation speakers S2 and S4 are tweeters and S1 and S3 are woofers etc. Therefore, depending on the example, the combiner (of the modules M2 and M4) may combine the amplified audio signal for two tweeters, two woofers, or a woofer and a tweeter etc.

Accordingly, examples of the invention extend to a PCB configured to receive a first audio signal, amplify the first audio signal, output a first amplified audio signal to a speaker (which may be a component of the PCB), receive a second audio signal, combine the first amplified audio signal and second audio signal into a combined signal, and output the combined signal. For these purposes, the PCB may comprise an amplifier to produce the first amplified audio signal and a combiner to receive the first amplified audio signal and second audio signal, combine them to produce the combined signal, and output the combined signal. The amplifier and/or combiner may be part of one IC or different ICs mounted on the PCB.

FIG. 16a shows an example PCB 1600a comprising an IC 1601a and a speaker 1604a. The IC 1601a may comprise any of the ICs above. For example, the PCB 1600a may represent an intermediate portion or the final portion in a signal chain, receiving an mth audio input $S_{INM}$, and the (m−1)th amplified audio output $S_{OUTM-1}$ from a prior point in the signal chain. The IC 1601a comprises an amplifier and combiner as described above and is configured to amplify the input audio signal and transmit the amplified audio signal $S_{OUTM}$ to the speaker 1604, and to the combiner in the IC. The combiner is configured to combine the amplified audio signal $S_{OUTM}$ with the received signal $S_{OUTM-1}$ to generate a combined signal $S_{CM-1M}$ and output to the combined signal $S_{CM-1M}$, either to the next combiner in the series or to a processor to perform echo cancellation.

FIG. 16b shows an example PCB 1600b. The PCB 1600b in this example may be used for a pair of speakers (such as a pair of tweeters, a pair or woofers, or a tweeter/woofer pair). The PCB 1600b comprises two ICs 1601b, 1603b and two speakers 1602b, 1604b. The received audio input $S_{INM}$ is passed to both ICs 1601b, 1603b. Each IC 1601b, 1603b, as described above, outputs an amplified signal $S_{OUTM1}$, $S_{OUTM2}$ to a respective speaker 1602b, 1604b, the amplified signal being received at a combiner of the IC 1601b, 1603b, that receives a further signal and generates and outputs a combined signal. The signal received by the combiner of the first IC 1601b is the signal $S_{OUTM-1}$ which may be the output from another amplifier or from another combiner. As indicated by the dotted lines emanating from the IC 1601b the combined signal may be output from the IC (as the signal $S_{CM-1M+M}$) and/or to the second IC 1603b where it is the input to the combiner of the second IC 1603, together with the amplified output signal $S_{OUTM2}$ from the amplifier of the second IC 1603b. Alternatively or additionally, the combiner of the second IC 1603b receives the signal $S_{OUTM-1}$, which may be the output from another amplifier or from another combiner. The second IC 1603b outputs the combined signal $S_{CM-1+M}$.

FIG. 16c similarly shows an example PCB 1600c. The PCB 1600c in this example may be for three speakers 1602c, 1604c, 1606c (e.g. a tweeter, a woofer, and a mid-range speaker etc.). As for FIG. 16b the input audio signal $S_{INM}$ is sent to each IC 1601c-1605c. As for the PCB 1600b, the combiner in each IC receives the amplified signal from its respective amplifier, and another input which is either from another IC (this signal path is not shown) or from another amplifier or another combiner (the signals $S_{OUTM-1}$, which may be the same audio signal or a different audio signal, depending on the example). Each IC 1601c-1605c outputs its combined signal at $S_{CM-1+M}$.

FIG. 16d shows an example PCB 1600d. The PCB 1600d in this example comprises one IC 1601d that is configured to transmit a plurality of amplified signals (two $S_{OUTM1}$, $S_{OUTM2}$ of which are shown in this example). The IC 1601d, in addition to a plurality of amplifiers which are each configured to output an amplified audio signal to a respective speaker 1602d, 1604d, comprises one or more combiners, configured to receive the amplified audio signals $S_{OUTM1}$, $S_{OUTM2}$ and a further signal $S_{OUTM-1}$ (which may be received from another combiner or another amplifier), combine the signals into a combined signal $S_{CM-1+M}$ and output the combined signal.

As stated elsewhere, any signals output from any of the PCBs 1600a-d may be received by a processor that may be configured to perform echo cancellation on the received signals. As also stated elsewhere, any of the examples described above may comprise an audio signal processor configured to generate a processed signal, e.g. as described above with respect to FIGS. 1 and 2.

FIG. 17 shows an example speaker 1700, microphone 1702, and processor 1704. Any of the devices, PCBs, audio systems IC or ICs etc. as above may comprise any one or more of the elements in FIG. 17. FIG. 17 shows a feedback path 1701 from the speaker (e.g. its output) to the microphone 1702. In other words, the microphone 1702 may receive, as its input, the speaker output which may cause feedback. 1701 may therefore be referred to as a feedback loop or acoustic leakage etc. The microphone 1702 is configured to transmit the signal it receives to the processor 1704, which is configured to perform an echo cancellation (or feedback cancellation) algorithm on the received signal. Optionally, the microphone 1702 may output its signal to a further processor 1703 (e.g. a DSP) which may output a processed signal to the processor 1704 and the processor 1704 may perform echo cancellation on the processed signal it receives from the processor 1703.

The speaker 1700 may comprise any speaker as discussed above. The processor 1704 may comprise any host processor as described above.

The microphone 1702 may be an input microphone, e.g. of a device. The microphone 1702 may be configured to receive a plurality of speaker outputs. In other examples, there may be provided a plurality of microphones, the plurality of microphones configured to receive the outputs of a plurality of speakers. In any example, the microphones may be configured to output their received signals to one (or more) processors for the processor(s) to perform echo cancellation on the received signals.

It will be appreciated that the figures in this document that depict ICs depict specific configurations or an IC. In other words, according to this disclosure there is provided an IC that may be configured according to any of FIGS. 1-16*c*. The precise configuration of an IC may be achieved according to any one or more of programming through firmware, reconfiguration, routing (e.g. through pulse-code-modulation).

Examples of the invention may be provided according to any one of the following numbered statements:

Statement 1. An audio system comprising:
an amplifier configured to output a first amplified audio signal to a speaker; and
a combiner, wherein the combiner is configured to:
  receive the first amplified audio signal from the amplifier;
  receive a second audio signal;
  combine the first amplified audio signal and second audio signal into a combined signal; and
  output the combined signal.

Statement 2. The system of statement 1, further comprising a delay line configured to delay the first amplified audio signal, wherein the combiner is configured to:
receive the delayed first amplified audio signal; and
combine the first delayed amplified audio signal and the second audio signal into the combined signal; and
output the combined signal.

Statement 3. The system of statement 1 or 2, wherein the system is configured to receive an audio signal, and wherein the system further comprises:
an first filter configured to produce a filtered audio signal from the received audio signal, and wherein the first amplified audio signal is the amplified filtered audio signal.

Statement 4. The system of any preceding statement, further comprises a second filter configured to:
separate the combined signal into first and second sub-signals,
and wherein the system is configured to:
output the first and second sub-signals.

Statement 5. The system of any preceding statement further comprising a delay line configured to delay the first and/or second sub-signal, and wherein the system is configured to:
output the first and/or second delayed sub-signal.

Statement 6. The system of any preceding statement, wherein combiner is configured to:
receive m signals, including the first amplified audio signal and the second audio signal;
combine the m received signals into n signals including the combined signal, with n<m; and
output the n signals.

Statement 7. The system of any preceding statement, wherein the amplifier is a first amplifier and wherein the system comprises a plurality of amplifiers including the first amplifier, and wherein the combiner is configured to receive the second audio signal from at least one other amplifier in the plurality.

Statement 8. The system of any preceding statement, wherein the plurality of amplifiers comprises a second amplifier, wherein the second amplifier is configured to output a second amplified audio signal to a speaker, and wherein the second audio signal comprises the second amplified audio signal such that the combiner is configured to:
receive the first amplified audio signal from the first amplifier;
receive the second amplified audio signal from the second amplifier;
combine the first amplified audio signal and the second amplified audio signal into the combined signal; and
output the combined signal.

Statement 9. The system of any preceding statement, wherein the combiner is a first combiner, and wherein the system comprises a second combiner, wherein the second audio signal is a second combined signal output from the second combiner.

Statement 10. The system of statement 10, wherein the amplifier is a first amplifier and wherein the speaker is a first speaker, wherein the system comprises a plurality of amplifiers including the first amplifier, a second amplifier, and a third amplifier, wherein the second amplifier is configured to output a second amplified audio signal to a second speaker, wherein the third amplifier is configured to output a third amplified audio signal to a third speaker, and wherein the second combiner is configured to:
receive the second amplified audio signal from the second amplifier;
receive the third amplified audio signal from the third amplifier;
combine the second amplified audio signal and the third amplified audio signal into the second combined signal; and
output the second combined signal,
and wherein the first combiner is configured to
receive the first amplified audio signal from the first amplifier;
receive the second combined signal from the second combiner;
combine the first amplified audio signal and the second combined signal into the first combined signal; and
output the first combined signal.

Statement 11. The system of any preceding statement, wherein the amplifier is a first amplifier wherein the combiner is a first combiner, and wherein the system comprises a plurality of amplifiers including the first amplifier and a plurality of combiners including the first combiner, and wherein each amplifier in the plurality is associated with a respective combiner, the respective combiner of each amplifier in the plurality being configured to:
- receive an amplified signal output from its respective amplifier in the plurality;
- receive another signal received from another amplifier or another combiner;
- combine the received signals into a combined signal; and output the combined signal.

Statement 12. The audio system of any preceding statement wherein the audio system is an integrated circuit comprising the amplifier and the combiner.

Statement 13. The audio system of any preceding statement, further comprising a codec, external processor, or DSP, and wherein the codec, external processor, or DSP comprises the combiner.

Statement 14. A device, such as a mobile phone, tablet, or computer, comprising the audio system of any preceding statement.

Statement 15. An audio system (which may comprise one or more integrated circuits) comprising:
- an amplifier configured to output a first amplified audio signal to a speaker; and
- a combiner, wherein the combiner is configured to:
  - receive a first number of audio signals including the first amplified audio signal from the amplifier;
  - receive a second number of audio signals;
  - combine the first and second number of signals into a third number of audio signals, the third number being less than the sum of the first and second numbers; and
  - output the third number of signals.

Statement 16. A printed circuit board (PCB) assembly comprising the audio system of any of statements 1-12, wherein the audio system is an IC mounted, attached, or otherwise secured to the PCT assembly; optionally wherein the PCB further comprises one or more speakers.

Statement 17. An audio system (which may comprise one or more integrated circuits) comprising a first module and another module joined in series; wherein the first module comprises a first amplifier and a second amplifier, and a first combiner configured to receive amplified audio outputs from the first and second amplifiers, combine them into a first combined audio signal; and output the first combined audio signal to the other module; wherein the other module comprises a third amplifier and a second combiner; wherein the second combiner is configured to receive the amplified audio output from the third amplifier and the first combined signal from the first module, combine them into a second combined audio signal, and output the second combined audio signal to another module or to a host processor.

Statement 18. An audio system (which may comprise one or more integrated circuits) comprising a plurality of amplifiers and a combiner, wherein the combiner is configured to receive a first number of amplified audio signals from two or more of the amplifiers, and combine one or more of the first number of audio signals into a second number of audio signals, the second number being less than the first, and output the second number of audio signals.

Statement 19. An audio system (which may comprise one or more integrated circuits) comprising one or signal chains, each signal chain being configured to reduce a plurality of amplified audio signals into a lesser number of amplified audio signals; each signal chain comprising at least two amplifiers and at least one combiner, the combiner in each chain being configured to receive a first number of audio signals and output a second, lesser, number of audio signals.

Features of any given aspect or example may be combined with the features of any other aspect or example and the various features described herein may be implemented in any combination in a given example.

The skilled person will recognise that where applicable the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications, embodiments of the invention will be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re-)programmable analogue array or similar device in order to configure analogue hardware.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. An audio system comprising:
an amplifier configured to output a first amplified audio signal to a speaker, wherein the audio system is configured to transmit a signal for echo cancellation, and wherein the signal for echo cancellation is based on the orientation of the speaker; and
a combiner configured to:
receive the first amplified audio signal from the amplifier;
receive a second audio signal;
combine the first amplified audio signal and second audio signal into a combined signal; and
output the combined signal, wherein the combined signal comprises the signal for echo cancellation.

2. The audio system of claim 1, wherein the amplifier has a transfer function and wherein the transfer function depends on the orientation of the speaker.

3. The audio system of claim 2, wherein the signal for echo cancellation depends on the transfer function of the amplifier.

4. The audio system of claim 1, wherein the amplifier settings depend on the orientation of the speaker.

5. The audio system of claim 1, wherein the amplifier is configurable as a woofer or as a tweeter.

6. The audio system of claim 1, wherein the function of the speaker depends on the position and/or orientation of the speaker.

7. The audio system of claim 1, wherein the second audio signal is an amplified audio signal.

8. The audio system of claim 1, further comprising a delay line configured to delay the first amplified audio signal, wherein the combiner is configured to:
receive the delayed first amplified audio signal;
combine the first delayed amplified audio signal and the second audio signal into the combined signal; and
output the combined signal.

9. The audio system of claim 1, further comprising a filter configured to:
separate the combined signal into first and second sub-signals,
and wherein the system is configured to:
output the first and second sub-signals.

10. The system of claim 9 further comprising a delay line configured to delay the first and/or second sub-signal, and wherein the system is configured to:
output the first and/or second delayed sub-signal.

11. The audio system of claim 1, wherein the amplifier is a first amplifier and wherein the system comprises a plurality of amplifiers including the first amplifier, and wherein the combiner is configured to receive the second audio signal from at least one other amplifier in the plurality.

12. The audio system of claim 11 wherein the combiner is configured to receive signals from two amplifiers of the plurality according to one or more of the following algorithms:
the combiner is configured to receive signals from two tweeter amplifiers in the plurality;
the combiner is configured to receive signals from two woofers amplifiers in the plurality;
the combiner is configured to receive signals from the two amplifiers that are nearest in distance to the combiner;
the combiner is configured to receive signals from the two tweeter amplifiers that are nearest in distance to the combiner;
the combiner is configured to receive signals from the two woofer amplifiers that are nearest in distance to the combiner.

13. The system of claim 11, wherein the plurality of amplifiers comprises a second amplifier, wherein the second amplifier is configured to output a second amplified audio signal to a speaker, and wherein the second audio signal comprises the second amplified audio signal such that the combiner is configured to:
receive the first amplified audio signal from the first amplifier;
receive the second amplified audio signal from the second amplifier;
combine the first amplified audio signal and the second amplified audio signal into the combined signal; and
output the combined signal.

14. The audio system of claim 1, wherein the combiner is a first combiner, and wherein the system comprises a second combiner, wherein the second audio signal is a second combined signal output from the second combiner.

15. The system of claim 14, wherein the amplifier is a first amplifier and wherein the speaker is a first speaker, wherein the system comprises a plurality of amplifiers including the first amplifier, a second amplifier, and a third amplifier, wherein the second amplifier is configured to output a second amplified audio signal to a second speaker, wherein the third amplifier is configured to output a third amplified audio signal to a third speaker, and wherein the second combiner is configured to:
receive the second amplified audio signal from the second amplifier;
receive the third amplified audio signal from the third amplifier;

combine the second amplified audio signal and the third amplified audio signal into the second combined signal; and output the second combined signal, and wherein the first combiner is configured to:

receive the first amplified audio signal from the first amplifier;

receive the second combined signal from the second combiner;

combine the first amplified audio signal and the second combined signal into the first combined signal; and output the first combined signal.

16. The audio system of claim 1, wherein the amplifier is a first amplifier wherein the combiner is a first combiner, and wherein the system comprises a plurality of amplifiers including the first amplifier and a plurality of combiners including the first combiner, and wherein each amplifier in the plurality is associated with a respective combiner, the respective combiner of each amplifier in the plurality being configured to:

receive an amplified signal output from its respective amplifier in the plurality;

receive another signal received from another amplifier or another combiner;

combine the received signals into a combined signal; and output the combined signal.

17. An integrated circuit comprising the audio system of claim 1.

18. A device comprising the audio system of claim 1, wherein the orientation of the speaker is based on the orientation of the device.

* * * * *